(12) United States Patent
Wilson

(10) Patent No.: US 8,063,000 B2
(45) Date of Patent: Nov. 22, 2011

(54) LOW BULK DENSITY PROPPANT AND METHODS FOR PRODUCING THE SAME

(75) Inventor: Brett Allen Wilson, Lafayette, LA (US)

(73) Assignee: Carbo Ceramics Inc., Houston, TX (US)

( * ) Notice: Subject to any disclaimer, the term of this patent is extended or adjusted under 35 U.S.C. 154(b) by 511 days.

(21) Appl. No.: 11/848,029

(22) Filed: Aug. 30, 2007

(65) Prior Publication Data

US 2008/0058228 A1 Mar. 6, 2008

Related U.S. Application Data

(60) Provisional application No. 60/840,987, filed on Aug. 30, 2006.

(51) Int. Cl.
*C09K 8/74* (2006.01)
(52) U.S. Cl. .................. 507/269; 501/4; 501/5
(58) Field of Classification Search .................. 507/269; 501/4, 5
See application file for complete search history.

(56) References Cited

U.S. PATENT DOCUMENTS

| | | |
|---|---|---|
| 1,942,431 A | 1/1934 | Jung |
| 2,566,117 A | 8/1951 | Christie et al. |
| 2,699,212 A | 1/1955 | Dismukes |
| 2,799,074 A | 7/1957 | Garloni |
| 2,950,247 A | 8/1960 | McGuire, Jr. et al. |
| 2,966,457 A | 12/1960 | Starmann et al. |
| 3,026,938 A | 3/1962 | Huitt et al. |
| 3,075,581 A | 1/1963 | Kern |
| 3,079,243 A | 2/1963 | Ueltz |
| 3,126,056 A | 3/1964 | Harrell |
| 3,241,613 A | 3/1966 | Kern et al. |
| 3,242,032 A | 3/1966 | Schott |
| 3,245,866 A | 4/1966 | Schott |
| 3,347,798 A | 10/1967 | Baer et al. |
| 3,350,482 A | 10/1967 | Bowers |
| 3,399,727 A | 9/1968 | Graham et al. |
| 3,437,148 A | 4/1969 | Colpoys, Jr. |
| 3,486,706 A | 12/1969 | Weyand |
| 3,491,492 A | 1/1970 | Ueltz |
| 3,497,008 A | 2/1970 | Graham et al. |
| 3,598,373 A | 8/1971 | Inman |
| 3,663,165 A * | 5/1972 | Haden et al. .................. 423/711 |
| 3,690,622 A | 9/1972 | Brunner et al. |
| 3,758,318 A | 9/1973 | Farris et al. |
| 3,810,768 A | 5/1974 | Parsons et al. |
| 3,856,441 A | 12/1974 | Suzukawa et al. |

(Continued)

FOREIGN PATENT DOCUMENTS

AR 241543 8/1992

(Continued)

OTHER PUBLICATIONS

Perry's Chemical Engineers' Handbook Section 12, 7th Edition, 1997, pp. 12-81 to 12-90.

(Continued)

*Primary Examiner* — Alicia Toscano
(74) *Attorney, Agent, or Firm* — Haynes and Boone, LLP

(57) ABSTRACT

Materials and methods for making low bulk density proppant capable of providing permeability at subterranean pressures. The low bulk density proppant is made from kaolin clay and at least one of calcined diatomaceous earth and burned kaolin clay.

6 Claims, 5 Drawing Sheets

U.S. PATENT DOCUMENTS

| | | |
|---|---|---|
| 3,890,072 A | 6/1975 | Barks |
| 3,939,246 A | 2/1976 | Rollmann |
| 3,976,138 A | 8/1976 | Colpoys, Jr. et al. |
| 4,051,603 A | 10/1977 | Kern, Jr. |
| 4,052,794 A | 10/1977 | Ganiaris |
| 4,053,375 A | 10/1977 | Roberts et al. |
| 4,061,596 A | 12/1977 | Matsushita et al. |
| 4,068,718 A | 1/1978 | Cooke, Jr. et al. |
| 4,072,193 A | 2/1978 | Sarda et al. |
| 4,077,908 A | 3/1978 | Stenzel et al. |
| 4,104,342 A | 8/1978 | Wessel et al. |
| 4,113,660 A | 9/1978 | Abe et al. |
| 4,140,773 A | 2/1979 | Stowell et al. |
| 4,166,147 A | 8/1979 | Lange et al. |
| 4,191,720 A | 3/1980 | Pasco et al. |
| 4,195,010 A | 3/1980 | Russell et al. |
| 4,268,311 A | 5/1981 | VerDow |
| 4,296,051 A | 10/1981 | Shimamura et al. |
| 4,303,204 A | 12/1981 | Weston |
| 4,343,751 A | 8/1982 | Kumar |
| 4,371,481 A | 2/1983 | Pollock |
| 4,396,595 A | 8/1983 | Heytmeijer et al. |
| 4,407,967 A | 10/1983 | Luks |
| 4,427,068 A | 1/1984 | Fitzgibbon |
| 4,439,489 A | 3/1984 | Johnson et al. |
| 4,440,866 A | 4/1984 | Lunghofer et al. |
| 4,442,897 A | 4/1984 | Crowell |
| 4,450,184 A | 5/1984 | Longo et al. |
| 4,462,466 A | 7/1984 | Kacknik |
| 4,493,875 A | 1/1985 | Beck et al. |
| 4,521,475 A | 6/1985 | Riccio et al. |
| 4,522,731 A | 6/1985 | Lunghofer |
| 4,547,468 A | 10/1985 | Jones et al. |
| 4,555,493 A | 11/1985 | Watson et al. |
| 4,601,997 A * | 7/1986 | Speronello .............. 502/263 |
| 4,618,504 A | 10/1986 | Bosna et al. |
| 4,623,630 A | 11/1986 | Fitzgibbon |
| 4,632,876 A | 12/1986 | Laird et al. |
| 4,639,427 A | 1/1987 | Khaund |
| 4,652,411 A | 3/1987 | Swarr et al. |
| 4,654,266 A | 3/1987 | Kachnik |
| 4,658,899 A | 4/1987 | Fitzgibbon |
| 4,668,645 A | 5/1987 | Khaund |
| 4,680,153 A | 7/1987 | Kinder et al. |
| 4,680,230 A | 7/1987 | Gibb et al. |
| 4,713,203 A | 12/1987 | Andrews |
| 4,714,623 A | 12/1987 | Riccio et al. |
| 4,732,920 A | 3/1988 | Graham et al. |
| 4,744,831 A | 5/1988 | Beck |
| 4,840,729 A | 6/1989 | Levine |
| 4,879,181 A | 11/1989 | Fitzgibbon |
| 4,894,189 A | 1/1990 | Dave et al. |
| 4,894,285 A | 1/1990 | Fitzgibbon |
| 4,911,987 A | 3/1990 | Sakata et al. |
| 4,921,820 A * | 5/1990 | Rumpf et al. .............. 501/128 |
| 4,921,821 A | 5/1990 | Rumpf et al. |
| 4,993,491 A | 2/1991 | Palmer et al. |
| 5,030,603 A | 7/1991 | Rumpf et al. |
| 5,120,455 A | 6/1992 | Lunghofer |
| 5,175,133 A | 12/1992 | Smith et al. |
| 5,188,175 A * | 2/1993 | Sweet .............. 166/280.2 |
| 5,266,243 A | 11/1993 | Kneller et al. |
| 5,422,183 A | 6/1995 | Sinclair et al. |
| 5,443,633 A | 8/1995 | Hirsbrunner et al. |
| 5,597,784 A | 1/1997 | Sinclair et al. |
| 5,649,596 A | 7/1997 | Jones et al. |
| 5,654,246 A | 8/1997 | Newkirk et al. |
| 5,656,568 A * | 8/1997 | Shiuh et al. .............. 502/412 |
| 5,964,291 A | 10/1999 | Bourne et al. |
| 5,972,835 A | 10/1999 | Gupta |
| 5,993,988 A | 11/1999 | Ohara et al. |
| 6,059,034 A | 5/2000 | Rickards et al. |
| 6,074,754 A | 6/2000 | Jacobsen et al. |
| 6,080,232 A | 6/2000 | Sperlich et al. |
| 6,123,965 A | 9/2000 | Jacob et al. |
| 6,217,646 B1 | 4/2001 | Gervais |
| 6,319,870 B1 | 11/2001 | Beall et al. |
| 6,330,916 B1 | 12/2001 | Rickards et al. |
| 6,364,018 B1 | 4/2002 | Brannon et al. |
| 6,372,678 B1 | 4/2002 | Youngman et al. |
| 6,503,676 B2 | 1/2003 | Yamashita et al. |
| 6,528,157 B1 | 3/2003 | Hussain et al. |
| 6,582,819 B2 | 6/2003 | McDaniel et al. |
| 6,632,527 B1 | 10/2003 | McDaniel et al. |
| 6,725,930 B2 | 4/2004 | Boney et al. |
| 6,743,269 B2 | 6/2004 | Meyer et al. |
| 6,749,025 B1 | 6/2004 | Brannon et al. |
| 6,753,299 B2 | 6/2004 | Lunghofer et al. |
| 6,766,817 B2 | 7/2004 | da Silva |
| 6,772,838 B2 | 8/2004 | Dawson et al. |
| 6,780,804 B2 | 8/2004 | Webber et al. |
| 6,918,404 B2 | 7/2005 | Dias da Silva |
| 7,021,379 B2 | 4/2006 | Nguyen |
| 7,036,591 B2 | 5/2006 | Cannan et al. |
| 7,041,250 B2 | 5/2006 | Sherman et al. |
| 7,066,586 B2 | 6/2006 | da Silva |
| 7,135,231 B1 | 11/2006 | Sinclair et al. |
| 7,244,398 B2 | 7/2007 | Kotary et al. |
| 7,285,255 B2 | 10/2007 | Kadlec et al. |
| 7,387,752 B2 | 6/2008 | Canova et al. |
| 7,459,209 B2 | 12/2008 | Smith et al. |
| 7,491,444 B2 | 2/2009 | Smith et al. |
| 7,569,199 B1 | 8/2009 | Barron et al. |
| 7,678,723 B2 | 3/2010 | Duenckel et al. |
| 7,721,804 B2 | 5/2010 | Duenckel |
| 7,825,053 B2 | 11/2010 | Duenckel et al. |
| 2002/0058581 A1 | 5/2002 | Youngman et al. |
| 2004/0023818 A1 | 2/2004 | Nguyen et al. |
| 2004/0040708 A1 | 3/2004 | Stephenson et al. |
| 2004/0200617 A1 | 10/2004 | Stephenson et al. |
| 2005/0019574 A1 | 1/2005 | McCrary |
| 2005/0028976 A1 | 2/2005 | Nguyen |
| 2005/0028979 A1 | 2/2005 | Brannon et al. |
| 2005/0077044 A1 | 4/2005 | Qu et al. |
| 2005/0244641 A1 | 11/2005 | Vincent |
| 2006/0006589 A1 | 1/2006 | Canova et al. |
| 2006/0078682 A1 | 4/2006 | McDaniel et al. |
| 2006/0081371 A1 | 4/2006 | Duenckel et al. |
| 2006/0135809 A1 | 6/2006 | Kimmich et al. |
| 2006/0147369 A1 | 7/2006 | Bi et al. |
| 2006/0162929 A1 | 7/2006 | Urbanek |
| 2006/0175059 A1 | 8/2006 | Sinclair et al. |
| 2006/0219600 A1 | 10/2006 | Palamara et al. |
| 2007/0023187 A1 | 2/2007 | Canova et al. |
| 2007/0212281 A1 | 9/2007 | Kadlec et al. |
| 2008/0015103 A1 | 1/2008 | Luscher et al. |
| 2008/0015531 A1 | 1/2008 | Hird et al. |
| 2008/0135245 A1 | 6/2008 | Smith et al. |
| 2008/0135246 A1 | 6/2008 | Canova et al. |
| 2008/0220996 A1 | 9/2008 | Duenckel et al. |
| 2008/0241540 A1 | 10/2008 | Canova et al. |
| 2009/0008093 A1 | 1/2009 | Duenckel |
| 2009/0032253 A1 | 2/2009 | Smith et al. |
| 2009/0032254 A1 | 2/2009 | Smith et al. |
| 2009/0038797 A1 | 2/2009 | Skala et al. |
| 2009/0038798 A1 | 2/2009 | Smith et al. |
| 2009/0065208 A1 | 3/2009 | Smith et al. |
| 2009/0118145 A1 | 5/2009 | Wilson et al. |
| 2009/0137433 A1 | 5/2009 | Smith et al. |
| 2009/0205825 A1 | 8/2009 | Smith, Jr. et al. |
| 2009/0288820 A1 | 11/2009 | Barron et al. |
| 2010/0059224 A1 | 3/2010 | Palamara et al. |
| 2010/0126728 A1 | 5/2010 | Duenckel et al. |

FOREIGN PATENT DOCUMENTS

| | | |
|---|---|---|
| AR | 243222 | 7/1993 |
| AU | 551409 | 1/1983 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |
| CH | 647689 | 2/1985 |
| CN | 1189475 | 8/1998 |
| DE | 2948584 | 6/1980 |

| | | |
|---|---|---|
| DK | 168099 | 7/1983 |
| EA | 006953 | 6/2006 |
| EA | 007864 | 2/2007 |
| EA | 008825 | 8/2007 |
| EA | 010944 | 12/2008 |
| EA | 011732 | 4/2009 |
| EA | 012824 | 12/2009 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| FR | 2486930 | 1/1982 |
| GB | 578424 | 7/1946 |
| GB | 715354 | 9/1954 |
| GB | 715882 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| MX | 161299 | 9/1990 |
| PE | 003273 | 11/1983 |
| PH | 18450 | 7/1985 |
| RU | 2014281 | 6/1994 |
| RU | 2079471 | 5/1997 |
| RU | 2083528 | 7/1997 |
| RU | 2090537 | 9/1997 |
| RU | 2098387 | 12/1997 |
| RU | 2098618 | 12/1997 |
| RU | 2099661 | 12/1997 |
| RU | 2107674 | 3/1998 |
| RU | 2112189 | 5/1998 |
| RU | 2112761 | 6/1998 |
| RU | 2121988 | 11/1998 |
| RU | 2129985 | 5/1999 |
| RU | 2129987 | 5/1999 |
| RU | 2133716 | 7/1999 |
| RU | 2140874 | 11/1999 |
| RU | 2140875 | 11/1999 |
| RU | 2147564 | 4/2000 |
| RU | 2147565 | 4/2000 |
| RU | 2147717 | 4/2000 |
| RU | 2150442 | 6/2000 |
| RU | 2151124 | 6/2000 |
| RU | 2151125 | 6/2000 |
| RU | 2151987 | 6/2000 |
| RU | 2154042 | 8/2000 |
| RU | 2155735 | 9/2000 |
| RU | 99107936 | 1/2001 |
| RU | 2163227 | 2/2001 |
| RU | 2166079 | 4/2001 |
| RU | 2168484 | 6/2001 |
| RU | 2178924 | 1/2002 |
| RU | 2180397 | 3/2002 |
| RU | 2183370 | 6/2002 |
| RU | 2183739 | 6/2002 |
| RU | 2191167 | 10/2002 |
| RU | 2191169 | 10/2002 |
| RU | 2191436 | 10/2002 |
| RU | 2192053 | 10/2002 |
| RU | 2196675 | 1/2003 |
| RU | 2196889 | 1/2003 |
| RU | 2198860 | 2/2003 |
| RU | 2203248 | 4/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| RU | 2229456 | 5/2004 |
| RU | 2229458 | 5/2004 |
| VE | 49128 | 2/1993 |
| WO | WO 2005/100007 | 10/2005 |
| WO | WO 2006/010036 | 1/2006 |
| WO | WO 2006/032008 | 3/2006 |
| WO | WO 2006/094074 | 9/2006 |
| WO | WO 2007/016268 | 2/2007 |
| WO | WO 2008/008828 | 1/2008 |
| WO | WO 2008/028074 | 3/2008 |
| WO | WO 2009/009370 | 1/2009 |

OTHER PUBLICATIONS

"rock." Encyclopedia Britannica 2007. Encyclopedia Britannica Article, Jun. 27, 2007.
Office Action mailed Jan. 21, 1992, by the USPTO regarding U.S. Appl. No. 07/769,584.
Notice of Allowance mailed Sep. 1, 1992, by the USPTO regarding U.S. Appl. No. 07/769,584.
Notice of Allowance mailed Jan. 7, 2005, by the USPTO regarding U.S. Appl. No. 10/268,169.
Notice of Allowance mailed Dec. 28, 2005, by the USPTO regarding U.S. Appl. No. 10/268,169.
Office Action mailed Sep. 7, 2006, by the USPTO regarding U.S. Appl. No. 11/103,777.
Advisory Action mailed Nov. 27, 2006, by the USPTO regarding U.S. Appl. No. 11/103,777.
Office Action mailed Feb. 27, 2007, by the USPTO regarding U.S. Appl. No. 11/103,777.
Office Action mailed Aug. 15, 2006, by the USPTO regarding U.S. Appl. No. 11/178,081.
Office Action mailed Jan. 30, 2007, by the USPTO regarding U.S. Appl. No. 11/178,081.
Advisory Action mailed Apr. 11, 2007, by the USPTO regarding U.S. Appl. No. 11/178,081.
Office Action mailed May 16, 2007, by the USPTO regarding U.S. Appl. No. 11/178,081.
Notice of Allowance mailed Feb. 5, 2008, by the USPTO regarding U.S. Appl. No. 11/178,081.
Office Action mailed Feb. 7, 2007, by the USPTO regarding U.S. Appl. No. 11/192,711.
Office Action mailed Jul. 13, 2007, by the USPTO regarding U.S. Appl. No. 11/192,711.
Office Action mailed Nov. 15, 2007, by the USPTO regarding U.S. Appl. No. 11/192,711.
Office Action mailed Aug. 16, 2007, by the USPTO regarding U.S. Appl. No. 11/226,476.
Office Action mailed Feb. 20, 2008, by the USPTO regarding U.S. Appl. No. 11/226,476.
Office Action mailed Jul. 24, 2008, by the USPTO regarding U.S. Appl. No. 11/365,230.
Office Action mailed Oct. 2, 2008, by the USPTO regarding U.S. Appl. No. 11/365,230.
Office Action mailed Mar. 19, 2009, by the USPTO regarding U.S. Appl. No. 11/365,230.
Notice of Allowance mailed Jun. 26, 2009, by the USPTO regarding U.S. Appl. No. 11/365,230.
Office Action mailed Sep. 5, 2008, by the USPTO regarding U.S. Appl. No. 12/032,301.
Office Action mailed Feb. 17, 2009, by the USPTO regarding U.S. Appl. No. 12/032,301.
Office Action mailed Aug. 11, 2009, by the USPTO regarding U.S. Appl. No. 12/032,301.
Office Action mailed Apr. 8, 2009, by the USPTO regarding U.S. Appl. No. 12/123,189.
Office Action mailed Aug. 13, 2009, by the USPTO regarding U.S. Appl. No. 12/123,189.
Office Action mailed May 28, 2009, by the USPTO regarding U.S. Appl. No. 12/166,504.
International Search Report mailed Aug. 29, 2006, by the ISA/US regarding International Application No. PCT/US2005/024339.
Written Opinion mailed Aug. 29, 2006, by the ISA/US regarding International Application No. PCT/US2005/024339.
International Preliminary Report on Patentability mailed Jan. 18, 2007, by the IB regarding International Application No. PCT/US2005/024339.
International Search Report mailed Oct. 4, 2006, by the ISA/US regarding International Application No. PCT/US2005/033092.

Written Opinion mailed Oct. 4, 2006, by the ISA/US regarding International Application No. PCT/US2005/033092.
International Preliminary Report on Patentability mailed Apr. 20, 2007, regarding International Application No. PCT/US2005/033092.
International Search Report mailed Jul. 13, 2007, by the ISA/US regarding International Application No. PCT/US2006/007308.
Written Opinion mailed Jul. 13, 2007, by the ISA/US regarding International Application No. PCT/US2006/007308.
International Search Report mailed Jun. 8, 2007, by the ISA/US regarding International Application No. PCT/US2006/029234.
Written Opinion mailed Jun. 8, 2007, by the ISA/US regarding International Application No. PCT/US2006/029234.
International Preliminary Report on Patentability mailed Feb. 7, 2008, by the IB regarding International Application No. PCT/US2006/029234.
International Search Report mailed Dec. 27, 2007, by the ISA/US regarding International Application No. PCT/US2007/073247.
Written Opinion mailed Dec. 27, 2007, by the ISA/US regarding International Application No. PCT/US2007/073247.
International Preliminary Report on Patentability mailed Jan. 13, 2009, by the IB regarding International Application No. PCT/US2007/073247.
International Preliminary Examination Report mailed Feb. 20, 2009, by the IB regarding International Application No. PCT/US2007/077290.
Written Opinion mailed Oct. 6, 2008, by the ISA/US regarding International Application No. PCT/US2008/069012.
International Preliminary Examination Report mailed Oct. 6, 2008, by the IB regarding International Application No. PCT/US2008/069012.
Correspondence from foreign counsel dated Nov. 29, 2007, regarding Office Action issued in connection with Eurasian Patent Application No. 200700296.
Correspondence from foreign counsel dated Feb. 29, 2008, regarding Office Action issued in connection with Eurasian Patent Application No. 200700583.
Correspondence from foreign counsel dated May 9, 2008, regarding Office Action issued in connection with Eurasian Patent Application No. 200700583.
Correspondence from foreign counsel dated Sep. 15, 2008, regarding Office Action issued in connection with Eurasian Patent Application No. 200700583.
Correspondence from foreign counsel dated Jul. 10, 2008, regarding Office Action issued in connection with Eurasian Patent Application No. 200701830.
Correspondence from foreign counsel dated Aug. 25, 2008, regarding Office Action issued in connection with Eurasian Patent Application No. 200800008.
Office Action issued Jun. 12, 2008, by the State Intellectual Property Office, P.R. China, regarding GCC Patent Application No. GCC/P/2005/4586.
Office Action issued Jun. 19, 2009, by the State Intellectual Property Office, P.R. China, regarding Chinese Patent Application No. 200580030660.3.
Office Action issued Aug. 21, 2009, by the State Intellectual Property Office, P.R. China, regarding Chinese Patent Application No. 200680038963.4.
Notice of Allowance mailed Dec. 7, 2009, from the USPTO, regarding U.S. Appl. No. 12/123,189.
Office Action mailed Dec. 29, 2009, from the USPTO, regarding U.S. Appl. No. 11/775,671.
Notice of Allowance mailed Sep. 3, 2010, from the USPTO, regarding U.S. Appl. No. 11/775,671.
Office Action mailed Jan. 12, 2010, from the USPTO, regarding U.S. Appl. No. 12/032,301.
Notice of Allowance mailed Mar. 8, 2010, from the USPTO, regarding U.S. Appl. No. 12/166,504.
Office Action mailed Mar. 15, 2010, from the USPTO, regarding U.S. Appl. No. 12/253,681.
Office Action mailed Sep. 1, 2010, from the USPTO, regarding U.S. Appl. No. 12/253,681.
Notice of Allowance mailed Aug. 26, 2010, from the USPTO, regarding U.S. Appl. No. 12/692,779.
Notice of Allowance mailed Aug. 27, 2009, from the Canadian IP Office, regarding Canadian Patent Application No. 2,444,826.
Office Action issued Dec. 18, 2009, by the State IP Office, P.R. China, regarding Chinese Patent Application No. 200580030252.8.
Office Action issued Jan. 22, 2010, by the State IP Office, P.R. China, regarding Chinese Patent Application No. 200680027748.4.
Office Action issued Mar. 3, 2010, by the State IP Office, P.R. China, regarding Chinese Patent Application No. 200680014974.9.
Correspondence from foreign counsel dated May 24, 2010, regarding Office Action issued from the Mexican Institute of Industrial Property regarding Mexico Patent Application No. MX/a/2007/002646.
Office Action mailed Nov. 12, 2010, by the USPTO, regarding U.S. Appl. No. 12/157,219.
Office Action issued Sep. 10, 2010, by the State IP Office, P.R. China, regarding Chinese Patent Application No. 200580030252.8.
Office Action issued Oct. 15, 2010, by the State IP Office, P.R. China, regarding Chinese Patent Application No. 200680014974.9.
U.S. Appl. No. 60/407,734, Stephenson et al.
U.S. Appl. No. 60/428,836, Stephenson et al.
U.S. Appl. No. 60/569,067, Brannon et al.
Office Action issued by the U.S. Patent and Trademark Office on Mar. 19, 2004, in connection with U.S. Appl. No. 10/268,169.
Office Action issued by the U.S. Patent and Trademark Office on Mar. 1, 2006, in connection with U.S. Appl. No. 11/103,777.
International Search Report issued by the ISA/US on Mar. 14, 2006 in connection with International Application No. PCT/US05/12256.
Written Opinion of the International Searching Authority issued by the ISA/US on Mar. 14, 2006 in connection with International Application No. PCT/US05/12256.
International Search Report issued by the ISA/US on Feb. 22, 2008 in connection with International Application No. PCT/US2007/077290.
Written Opinion of the International Searching Authority issued by the ISA/US on Feb. 22, 2008 in connection with International Application No. PCT/US2007/077290.
Determining Feasibility of Fabricating Light Weight Proppants for Application in Gas and Oil Well Stimulation, Progress Report 10, DOE Contract DE-AC19-79BC10038, Submitted by Terra Tek, Inc., TR 80-77, Jul. 1980.
Light Weight Proppants for Deep Gas Well Stimulation, $2^{nd}$ Annual Report, Jul. 1, 1980-Jun. 30, 1981, published Apr. 1982, DOE Contract AC19-79BC10038, by R.A. Cutler et al, Terra Tek, Inc.
Oxide Ceramic Proppants for Treatment of Deep Well Fractures, SPE 6816, by E.A. Neel, J.L. Parmley, and P.J. Colpoys, Jr. (1977).
Chemical Abstracts, vol. 85, No. 24, Dec. 13, 1976.
Hydraulic Fracturing with a High-Strength Proppant, Claude E. Cooke, Society of Petroleum Engineers of AIME, SPE 6213, 1976.
The Effect of Various Proppants and Proppant Mixtures on Fracture Permeability, Robert R. McDaniel, et al., SPE 7573, 1978.
UCAR Ceramic Props, The Ideal Proppant for Deep Wells and High Compaction Pressures.
DOE Progress Review No. 21 for reporting period Oct. 1-Dec. 31, 1979, Determining Feasibility of Fabricating Light Weight Proppants for Application in Gas and Oil Well Stimulation.
DOE Progress Review No. 22 for reporting period Jan. 1-Mar. 31, 1980, Determining Feasibility of Fabricating Light Weight Proppants for Application in Gas and Oil Well Stimulation.
DOE Progress Review No. 23 for reporting period Apr. 1-Jun. 30, 1980, Determining Feasibility of Fabricating Light Weight Proppants for Application in Gas and Oil Well Stimulation.
DOE Progress Review No. 24 for reporting period Jul. 1-Sep. 31, 1980, Determining Feasibility of Fabricating Light Weight Proppants for Application in Gas and Oil Well Stimulation.
DOE Progress Review No. 26 for reporting period Jan. 1-Mar. 31, 1981, Determine Feasibility of Fabricated Light Weight Proppants for Application in Gas and Oil Well Stimulation.
DOE Progress Review No. 27 for reporting period Apr. 1-Jun. 30, 1981, Determining Feasibility of Fabricating Light Weight Proppants for Application in Gas and Oil Well Stimulation.
Determining Feasibility of Fabricating Light Weight Proppants for Application in Gas and Oil Well Stimulation, Progress Report 2, DOE Contract DE-AC19-79BC10038, Submitted by Terra Tek, Inc., TR 79-77, Oct. 1979.

Light Weight Proppants for Deep Gas Well Stimulation, A. H. Jones et al, Terra Tek, Inc., Jun. 1980, TR Report 80-47.

New Proppants for Deep Gas Well Stimulation, SPE 9869, by Raymond A. Cutler, et al., 1977.

Effect of Grinding and Firing Treatment on the Crystalline and Glass Content and the Physical Properties of Whiteware Bodies; S. C. Sane, et al., 1951.

Nepheline Syenite-Talc Mixtures as a Flux in Low-Temperature Vitrified Bodies; E. D. Lynch, et al., Apr. 1950.

Engineering Properties of Ceramics, Databook to Guide Materials Selection for Structural Applications, J. F. Lynch, et al., TR 66-52, Jun. 1966.

Reactions in Silica-Alumina Mixtures, Richard R. West, et al., Apr. 1958.

Synthesis and Mechanical Properties of Stoichiometric Aluminum Silicate (Mullite), K. S. Mazdiyasni, et al., Dec. 1972.

Coors Porcelain Company letter to Halliburton Services, Inc. dated Aug. 4, 1978 with Proposal to Supply Proppant.

Coors Porcelain Company letter to B. J. Hughes, Inc. dated Aug. 24, 1978 with Proposal to Supply Proppant.

Unimin Brochure, Unimin Canada Ltd., Mar. 1991.

Role of Impurities on Formation of Mullite from Kaolinite and $Al_2O_3$-$S_iO_2$ Mixtures, Johnson, Sylvia M. et al., Ceramic Bulletin, vol. 61, No. 8 (1982), pp. 838-842.

Bauxite and Alumina, Luke H. Baumgardner, et al., Minerals Yearbook, 1987, vol. I.

The Industrial Uses of Bauxite, N. V. S. Knibbs, D.Sc., 1928.

Bauxite, Cyril S. Fox, 1927.

Pages from The National Atlas of the United States of America.

Document entitled "Feb. Mar. Apr. 1998: Commercial Activity", with Exhibits A-D.

Document entitled "Jul. 1998: Commercial Activity", with Exhibit E.

Document entitled "Sep. 2001: Commercial Activity", with Exhibit F.

ScalePROP brochure, Schlumberger, Jan. 2002.

Rickards, A. R., et al.; "High Strength, Ultra Lightweight Proppant Development Lends New Dimensions to Hydraulic Fracturing Applications", SPE 84308, Oct. 7, 2003.

Didion International, Inc.; Mold & Core Consumables; http://www.moderncasting.com/MoreInfo/0602/FMI_Article_08.asp; Dec. 27, 2002.

Itochu Ceratech Corp.; Ceramics and Minerals Department; http://www.itc-cera.co.jp/english/cera.htm; Jun. 8, 2002.

Enprotech Corp; About Enprotech; http:www.enprotech.com/aboutus.html; Copyright 2004.

Spraying Systems Co.; Air Atomizing Nozzles 1/2J Pressure Spray Set-ups Internal Mix; Air Atomizing Nozzles 1/2J Series External Mix Set-ups; Air Atomizing Nozzles 1/2J Siphon/Gravity-Fed Spray Set-ups; pp. 358-362; Copyright 2003.

Spraying Systems Co.; Air Atomizing Nozzles 1/8J and 1/4J Set-ups External Mix; pp. 282-285; Copyright 2003.

Spraying Systems Co.; Air Atomizing Nozzles Basic Information; pp. 268-269; Copyright 2003.

Spraying Systems Co.; Engineer's Guide to Spray Technology; Copyright 2000.

Environmental Conservation-Oriented Businesses; Itochu Corporation; pp. 11-16; Jul. 2004.

Itochu Ceratech Corporation; CERABEADS—Spherical Ceramic Sand; http://exhibits.gifa.de/exh/GMTN2003/e/3231240; Mar. 13, 2005.

Naigai Ceramics Co., Ltd.; Naigai Cerabeads 60; Aug. 1986.

* cited by examiner

LOW BULK DENSITY PROPPANT AND METHODS FOR PRODUCING THE SAME

CROSS-REFERENCE TO RELATED APPLICATIONS

This patent application is a non-provisional of U.S. Patent Application No. 60/840,987, filed on Aug. 30, 2006 entitled "Method for Producing Proppants that Provide Permeability at Subterranean Pressures and Have a Low Bulk Density," which is incorporated by reference herein in its entirety.

BACKGROUND

The present disclosure relates to methods and materials for making a low bulk density proppant capable of providing permeability at subterranean pressures.

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles (all of which can be referred to as "proppant"), which are carried into the fracture by means of a fluid or gel (both of which can be referred to as "fracture fluid"). As the density of the proppant decreases, the fracture fluid used to carry the proppant into the fracture can have lower viscosity, which reduces the cost of the fracture fluid as well as reduces what is referred to as "gel damage". Gel damage is caused by viscous fracture fluid which remains in the formation and blocks flow of gas or oil to the well bore. Additionally, as the density of the proppant decreases, it becomes easier and cheaper to pump the proppant into the fracture, and the proppant can get carried further into the fracture which will increase the oil or gas production for the well.

DETAILED DESCRIPTION

Figure 1:
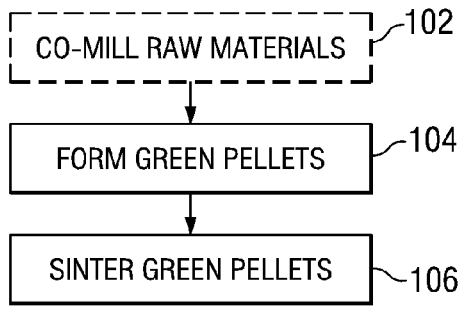
FIG. 1 illustrates a flow-chart diagram of a method for making a low bulk density proppant capable of providing permeability at subterranean pressures.

The present disclosure relates to methods and materials for making a low bulk density proppant capable of providing permeability at subterranean pressures.

"Bulk density", as used herein, is the mass or weight of material per unit volume, including in the volume considered, the void spaces between the particles.

"Low bulk density", as used herein, means a bulk density that is lower than the bulk density of conventional proppants such as sand and ceramic proppants. In certain embodiments, a low bulk density proppant means a proppant that has a bulk density less than about 1.60 g/cc, less than about 1.50 g/cc, less than about 1.40 g/cc, less than about 1.30 g/cc, less than about 1.20 g/cc, less than 1.10 g/cc, or less than 1.00 g/cc. In certain other embodiments, a low bulk density proppant formed by a method described herein can have a bulk density less than silica sand, or traditional lightweight ceramic proppant made primarily from clay. Other embodiments provide a proppant having a bulk density that is 15%, 20%, 25% or 30% less than silica sand or traditional lightweight ceramic proppant made primarily from clay. Silica sand has a bulk density of about 1.55-1.65 g/cc and traditional lightweight ceramic proppant made primarily from clay has a bulk density of about 1.50-1.60 g/cc.

In certain embodiments, a low bulk density proppant is made from kaolin clay and at least one of calcined diatomaceous earth and burned kaolin clay. In some embodiments, a low bulk density proppant is made from kaolin clay and calcined diatomaceous earth. In other such embodiments, a low bulk density proppant is made from kaolin clay and burned kaolin clay. In still other such embodiments, a low bulk density proppant is made from kaolin clay, calcined diatomaceous earth and burned kaolin clay.

Other embodiments provide a coating that covers substantially all of the surface porosity of the proppant to form a coated proppant having an apparent specific gravity lower than the apparent specific gravity of the proppant without a coating.

The permeability of a proppant is an important characteristic relating to the conductivity of fluids at various closure stresses. A permeability test can be run on proppants to determine the decrease of fluid flow rate through the proppant sample as the vertical pressure (or closure stress) on the proppant pack is increased. In the short term permeability test (American Petroleum Institute Recommended Practices 61), a measured amount of proppant, e.g. two pounds per sq. ft., is placed in a cell and a fluid (usually deionized water) is passed through the proppant pack at various flow rates. As pressure increases on the pack, it causes the proppant to crush, thereby decreasing the flow capacity that is being measured. The permeability of proppant provides valuable information about how the proppant will perform in a subterranean formation. The proppant of this invention has a short term permeability greater than that of proppant having a bulk density of less than 1.60 g/cc made from pellets consisting of water and calcined, partially calcined or uncalcined kaolin. In other embodiments, the proppant has a short term permeability that is 10% to 50% greater than the short term permeability of the proppant having a bulk density less than about 1.60 g/cc made from pellets consisting of water and calcined, partially calcined or uncalcined kaolin. In other certain embodiments the proppant is a sintered substantially round and spherical particle having a bulk density less than about 1.60 g/cc and a 4 Kpsi short term permeability greater than 187 Darcies.

Clay refers to clay minerals that consist of a variety of phyllosilicate minerals. Kaolinite, montmorillonite-smectite, illite, and chlorite are several main groups of phyllosilicate minerals. Kaolin clay is found in many parts of the world and consists mostly of kaolinite ($Al_2Si_2O_5(OH)_4$) with admixtures of quartz, feldspar, aluminum hydroxides, and iron hydroxides. Kaolinite is a layered silicate made of alternating sheets of octahedrally coordinated aluminum and tetrahedrally coordinated silicon that are bonded by hydroxyl groups. Kaolinite has a low shrink-swell capacity and a low cation exchange capacity (1-15 meq/100 g).

According to certain embodiments of the present invention that include kaolin clay, the kaolin clay can be in uncalcined, partially calcined, or calcined forms or mixtures of such forms so long as the kaolin clay has less than 5 weight percent of mullite. The term "uncalcined kaolin clay" is understood by those of ordinary skill in the art to mean kaolin clay in its natural, "as-mined", condition. Uncalcined kaolin clay has not been subjected to any type of treatment that would result in a chemical or mineralogical change, and can also be referred to as "raw" kaolin clay. Uncalcined kaolin clay is typically comprised of a majority of kaolinite ($Al_2Si_2O_4(OH)_4$) and a minority of silica in amorphous and various crystalline polymorph forms, and/or gibbsite and/or diaspore. Uncalcined kaolin clay does not include any meta-kaolin ($Al_2Si_2O_6$) or mullite ($3.Al_2O_3.2.SiO_2$) or pure alumina (from diaspore or gibbsite) because the application of heat is needed to convert kaolinite to meta-kaolin or mullite.

The terms "partially calcined kaolin clay" and "calcined kaolin clay" and are understood by those of ordinary skill in the art to mean kaolin clay that has been subjected to a heat treatment at times and temperatures above 550° C. to about 800° C., preferably from about 550° C. to about 600° C., to remove some (partially calcined) or substantially all (calcined) organic material and water of hydration from the clay (or gibbsite or diaspore). Partially calcining or calcining kaolin clay causes conversion of some (partially calcined) or substantially all (calcined) of the kaolinite in the clay to meta-kaolin, which is an amorphous pozzolan material.

As used herein, the term "burned kaolin clay" refers to uncalcined kaolin clay, partially calcined kaolin clay, or calcined kaolin clay that has been subjected to a heat treatment at times and temperatures sufficient to convert the kaolinite to mullite and such that the burned kaolin clay includes at least 5 weight percent of mullite. Burned kaolin clay has enhanced chemical bonding properties when mixed with other components as compared to non-burned kaolin clay. Burned kaolin clay undergoes a heat treatment that substantially removes organic material and water of hydration, and causes crystallographic changes in the kaolin, meta-kaolin, or silica (quartz) present in the clay. The heat treatment includes heating the kaolin clay at least above 800° C., preferably from about 900° C. to about 1100° C., to irreversibly convert some of the meta-kaolin to mullite and to convert some of the silica to cristobalite. Mullite and cristobalite are crystalline forms of alumina and silica, respectively.

In certain embodiments of the present invention in which the low bulk density proppant is made from kaolin clay and burned kaolin clay, the burned kaolin clay comprises at least about 10 weight percent mullite, while in other such embodiments, the burned kaolin clay comprises at least about 50 weight percent mullite, at least about 65 weight percent mullite, at least about 80 weight percent mullite, at least about 90 weight percent mullite, or at least about 95 weight percent mullite. In other embodiments, the burned kaolin comprises at least 65 weight percent of mullite and at least 15 weight percent of cristobalite. In still other such embodiments, the burned kaolin clay comprises about 65 weight percent mullite, about 15 to about 25 weight percent cristobalite, and about 10 to about 20 weight percent amorphous silica.

An embodiment of the present invention provides a method for producing a low bulk density proppant that includes heating kaolin clay sufficient to produce burned kaolin clay comprising at least 5 weight percent of mullite, co-milling kaolin clay and the burned kaolin clay to form a co-milled mixture, forming substantially round and spherical green pellets from the co-milled mixture and water, and sintering the pellets to form a proppant having a bulk density of less than about 1.60 g/cc. The proppant has a short term permeability greater than that of proppant having a bulk density of less than 1.60 g/cc but made from pellets consisting of water and calcined, partially calcined, or uncalcined forms of the kaolin clay. In other embodiments, the burned kaolin clay comprises at least 50 weight percent of at least one of mullite and cristobalite. In certain other embodiments, the burned kaolin clay comprises at least 65 weight percent of mullite and at least 15 weight percent of cristobalite.

According to certain embodiments of the present invention, a plurality of pellets are made from a mixture of kaolin clay and burned kaolin clay. A proppant formed from the pellets has a bulk density of less than 1.60 g/cc. In other embodiments, the kaolin clay and burned kaolin clay mixture includes about 70 to about 90 weight percent of kaolin clay and about 10 to about 30 weight percent of burned kaolin clay. In certain other embodiments, the kaolin clay and burned kaolin clay mixture includes about 80 to about 85 weight percent of kaolin clay and about 15 to about 20 weight percent of burned kaolin clay. Still other embodiments provide that the burned kaolin clay comprises at least 5 weight percent of mullite. In yet another embodiment, the burned kaolin clay comprises at least 50 weight percent of mullite. In certain other embodiments, the burned kaolin clay comprises at least 65 weight percent of mullite and at least 15 weight percent of cristobalite.

As used herein, the term "calcined diatomaceous earth" refers to diatomaceous earth that has been subjected to a heat treatment at times and temperatures sufficient to remove sufficient amounts of organic material and water of hydration from the diatomaceous earth to reduce the loss on ignition of the diatomaceous earth to less than about 4 weight percent.

According to an embodiment of the present invention, a plurality of pellets are made from a mixture of kaolin clay and calcined diatomaceous earth. The proppant made from the pellets has a bulk density of less than about 1.60 g/cc. In some embodiments, the kaolin clay and calcined diatomaceous earth mixture includes from about 70 to about 92.5 weight percent of kaolin clay and about 7.5 to about 30 weight percent of calcined diatomaceous earth. In other embodiments, the kaolin clay and calcined diatomaceous earth mixture includes from about 80 to about 90 weight percent of kaolin clay and about 10 to about 20 weight percent of calcined diatomaceous earth.

According to an embodiment of the present invention, a proppant is provided that comprises a plurality of sintered, spherical pellets, the pellets being prepared from a mixture of kaolin clay, calcined diatomaceous earth, and burned kaolin clay. In other embodiments, the kaolin clay, calcined diatomaceous earth, and burned kaolin clay mixture includes from about 75 to about 90 weight percent of kaolin clay, about 5 to about 10 weight percent of calcined diatomaceous earth, and about 5 to about 15 weight percent of burned kaolin clay.

An embodiment of the present invention provides a method for producing a low bulk density proppant that includes co-milling kaolin clay and calcined diatomaceous earth to form a co-milled mixture, forming substantially round and spherical green pellets from the co-milled mixture and water, and sintering the pellets to form a proppant having a bulk density of less than about 1.60 g/cc. The proppant formed has a short term permeability greater than that of proppant having a bulk density of less than about 1.60 g/cc but made from pellets consisting of water and calcined, partially calcined or uncalcined forms of kaolin clay.

An embodiment of the present invention provides a method for propping fractures in subterranean formations including mixing a fluid and a proppant and introducing the mixture into a fracture in a subterranean formation. The proppant comprises a plurality of sintered substantially round and spherical particles made from kaolin clay and at least one of calcined diatomaceous earth and burned kaolin clay, and having a bulk density of less than about 1.60 g/cc and a 4 Kpsi short term permeability greater than 187 Darcies. In certain embodiments, the proppant is coated to form a coated proppant that has an apparent specific gravity lower than the apparent specific gravity of the proppant without a coating.

An embodiment of the present invention provides a method for forming a low bulk density proppant including forming substantially round and spherical green pellets from raw materials that include water, kaolin clay, and at least one of calcined diatomaceous earth and burned kaolin clay and sintering the pellets to form a proppant having a bulk density of less than about 1.60 g/cc. The proppant has a short term permeability greater than that of a proppant having a bulk density of less than about 1.60 g/cc but made from pellets consisting of water and calcined, partially calcined or uncalcined forms of kaolin clay.

In other certain embodiments of the present invention, the method for forming a low bulk density proppant includes coating the proppant with a material to create a coated proppant having an apparent specific gravity lower than the apparent specific gravity of the proppant without a coating.

In other embodiments of the present invention, the method for forming a low bulk density proppant includes co-milling the kaolin clay and at least one of calcined diatomaceous earth and burned kaolin clay.

Referring now to FIG. 1, methods for making a low bulk density proppant from kaolin clay and at least one of calcined diatomaceous earth and burned kaolin clay are illustrated.

Operation 102 is optional, but is included in certain embodiments of the present invention. In operation 102, the kaolin clay and at least one of the calcined diatomaceous earth and burned kaolin clay are milled together to form a co-milled mixture. As used herein, the kaolin clay and at least one of calcined diatomaceous earth and burned kaolin clay are deemed to be co-milled when they have been milled together under conditions sufficient to produce a co-milled mixture where 99% of the particles in the blend have a size less than 50 microns, and 90% of the particles in the blend have a size less than 10 microns. A variety of suitable methods and equipment for co-milling are known to those of ordinary skill in the art, for example, jet-milling and ball-milling are suitable.

In operation 104, substantially round and spherical green pellets are formed from raw materials including kaolin clay and at least one of calcined diatomaceous earth and burned kaolin clay. According to certain embodiments, substantially round and spherical green pellets are formed via any suitable mixing process known to those of ordinary skill in the art. In some embodiments, substantially round and spherical green pellets are formed by a process that is referred to as "dry", while in other embodiments, substantially round and spherical green pellets are formed by a process that is referred as "wet".

As an example of a suitable "dry" process, the kaolin clay and at least one of the calcined diatomaceous earth and the burned kaolin clay are co-milled to form a particulate mixture, which is then mixed with water in a high intensity mixer. Suitable commercially available intensive stirring or mixing devices have a rotatable horizontal or inclined circular table and a rotatable impacting impeller, such as described in U.S. Pat. No. 3,690,622, to Brunner, the entire disclosure of which is incorporated herein by reference. Sufficient water is added to the mixture to cause formation of substantially round and spherical pellets. In general, the total quantity of water which is sufficient to cause substantially round and spherical pellets to form is from about 15 to about 30 weight percent of the particulate mixture. Those of ordinary skill in the art will understand how to determine a suitable amount of water to add to the mixer so that substantially round and spherical pellets are formed. In addition to the water and the particulate mixture, a binder may be added to the initial mixture to improve the formation of pellets and to increase the green strength of the unsintered pellets. Suitable binders include but are not limited to various resins or waxes, bentonite, corn starch, polyvinyl alcohol or sodium silicate solution, or a blend thereof. The amount of time to mix the water and the particulate mixture to form substantially round and spherical green pellets can be determined by visual observation of the pellets being formed, but is typically from about 2 to about 15 minutes.

"Dry" processes similar to the above-described "dry" process that are suitable for use with the methods described herein, and which are also known to those of ordinary skill in the art, include those described in U.S. Pat. Nos. 4,427,068; 4,879,181; 4,895,284; and 7,036,591 the entire disclosures of which are incorporated herein by reference.

An example of a suitable "wet" process is a fluid bed process, in which the kaolin clay and at least one of the calcined diatomaceous earth and the burned kaolin clay are added to form a particulate mixture, and mixed in a blunger (or similar device) with a sufficient amount of water to form a slurry having a solids content in the range of from about 40 to about 60 weight percent. Those of ordinary skill in the art will understand how to determine a sufficient amount of water to form a slurry having a solids content in the range of from about 40 to about 60 weight percent. Those of ordinary skill in the art also understand slurry manufacturing, and therefore understand that the amount of water mixed with the particulate mixture in a "wet" process is greater than the amount of water mixed with the particulate mixture in a "dry" process. Generally, slurry processing requires a combination of water and solids (raw materials) that behaves like a liquid, while dry processing requires a combination of water and solids (raw materials) that behaves like a solid. A binder may be added to the initial mixture to improve the formation of pellets and to increase the green strength of the unsintered pellets. Suitable binders include but are not limited to polyvinyl acetate, polyvinyl alcohol (PVA), methylcellulose, dextrin and molasses.

The kaolin clay and at least one of the calcined diatomaceous earth and the burned kaolin clay may be co-milled prior to mixing with water in the blunger, or co-milling may occur with the addition of the water in the blunger. In addition, one or more of a dispersant, a pH-adjusting reagent, a defoamer, and a binder can be added to the slurry in the blunger.

Dispersants and pH-adjusting reagents can be added to adjust the viscosity of the slurry so as to achieve a target viscosity. A target viscosity is that viscosity that can be processed through a given type and/or size of the pressure nozzle of a subsequent fluidizer, without becoming clogged. Generally, the lower the viscosity of the slurry, the better it can be processed through a given fluidizer. However, at some concentration of dispersant, the dispersant can cause the viscosity of the slurry to increase to a point that it cannot be satisfactorily processed through a given fluidizer. One of ordinary skill in the art can determine the appropriate amount of dispersant and the target viscosity for given fluidizer types through routine experimentation. If a pH-adjusting reagent is used, then the amount of pH-adjusting reagent added to the slurry should be that amount which gives the slurry a pH in the range of from about 8 to about 11. Selection of a suitable dispersant or pH-adjusting reagent to achieve a target viscosity and/or pH can be made by those of ordinary skill in the art through routine experimentation.

A defoamer can be added to the slurry in the blunger to reduce or prevent equipment problems caused by foaming of the slurry. Those of ordinary skill in the art can identify and select a suitable type and amount of defoamer to use in the processes described herein through routine experimentation.

A binder may be added to the slurry in the blunger, or preferably, the slurry may be fed from the blunger to a separate tank prior to the addition of the binder. If binder is added to the slurry in the blunger, then it is preferable to reduce the mixing speed of the blunger prior to addition of the binder so as to reduce or prevent excessive foaming and/or viscosity increases that may occur. Binder can be added to the slurry in an amount of from about 0.25 to about 5.0 weight percent, based on the total dry weight of the kaolin clay and at least one of calcined diatomaceous earth and the burned kaolin clay. Suitable binders include but are not limited to polyvinyl acetate, polyvinyl alcohol (PVA), methylcellulose, dextrin and molasses. In certain embodiments, the binder is a PVA binder having a molecular weight in a range of from about 20,000 to 100,000 Mn. "Mn" is a unit known to those of ordinary skill in the art to indicate the number length average for determining the molecular weight of a chained molecule. Whether binder, if any, is added to the slurry in the blunger or, as preferred, in a separate tank, the slurry is continually stirred, after addition of the binder, for an amount of time sufficient to allow for the binder to become thoroughly mixed throughout the slurry. In certain embodiments, the amount of time the slurry is stirred is up to about 30 minutes or more after the binder has been added.

From the blunger, or if a binder is used, preferably a separate tank, the slurry is fed to a heat exchanger, which heats the slurry to a temperature in a range of from about 25° C. to about 90° C. From the heat exchanger, the slurry is fed to a pump system, which feeds the slurry, under pressure, to a fluidizer. By virtue of the blunger, and/or the stirring occurring in the tank, any particles in the slurry are reduced to a target size of less than about 230 mesh so that the slurry can be fed to the fluidizer without clogging of the fluidizer nozzles or other equipment problems. In certain embodiments, the target size of the particles is less than 325 mesh, less than 270 mesh, less than 200 mesh or less than 170 mesh. The target size of the particles is influenced by the ability of the type and/or size of the pressure nozzle in the subsequent fluidizer to atomize the slurry without becoming clogged. In some embodiments, the slurry may be fed through either or both of a grinding mill(s) and/or a screening system(s) to assist in breaking down and/or removing any larger-sized material to a size suitable for feeding to the fluidizer.

Heat exchangers, pump systems and fluidizers, and their methods of operation, are known to those of ordinary skill in the art, and therefore need not be detailed herein. However, a general description of a fluidizer suitable for use with the methods described herein is provided for the convenience of the layperson. The fluidizer has one or more atomizing nozzles, and a particle bed comprised of "seeds". The slurry is sprayed, under pressure, through the atomizing nozzles, and the slurry spray coats the seeds in the particle bed.

Hot air is introduced into the fluidizer, and passes through the particle bed at a velocity in a range of from about 0.9 to about 1.5 meters/second, and the depth of the particle bed is in a range of from about 2 to about 60 centimeters. The temperature of the hot air when introduced to the fluidizer is in a range of from about 250° C. to about 650° C. The temperature of the hot air as it exits from the fluidizer is less than about 250° C., and preferably less than about 100° C. Substantially round and spherical green pellets accumulate in the particle bed, and are withdrawn through an outlet in response to the level of product in the particle bed, so as to maintain a given depth in the particle bed. The substantially round and spherical green pellets withdrawn from the particle bed can be separated into one or more fractions, for example, an oversize fraction, a product fraction, and an undersize fraction. Undersized and oversized fractions can be recycled into the slurry, and the substantially round and spherical green pellets comprising the product fraction can be subjected to sintering operation 106, with or without drying. In certain embodiments, the particles are dried prior to sintering operation 106 to a moisture content of less than about 18 weight percent, less than about 15 weight percent, less than about 12 weight percent, less than about 10 weight percent, less than about 5 weight percent, or less than about 1 weight percent. If the substantially round and spherical green pellets are dried prior to sintering operation 106, then such drying may also comprise partially calcining or calcining the substantially round and spherical green pellets.

"Wet" processes similar to the above-described "wet" process that are suitable for use with the methods described herein, and which are also known to those of ordinary skill in the art, include those described in U.S. Pat. Nos. 4,440,866 and 5,120,455, the entire disclosures of which are incorporated herein by reference.

Another example of a suitable "wet" process for forming substantially round and spherical green pellets is a spray drying process, in which the kaolin clay and at least one of the calcined diatomaceous earth and the burned kaolin clay are added to form a particulate mixture, and mixed in a blunger (or similar device) with a sufficient amount of water to form a slurry having a solids content in the range of from about 50 to about 75 weight percent. Those of ordinary skill in the art will understand how to determine a sufficient amount of water to form a slurry having a solids content in the range of from about 50 to about 75 weight percent. The kaolin clay and at least one of the calcined diatomaceous earth and the burned kaolin clay may be co-milled prior to mixing with water in the blunger, or co-milling may occur with the addition of the water in the blunger.

In addition, one or more of a dispersant, a defoamer, and a binder can be added to the slurry in the blunger. A defoamer can be added to the slurry in the blunger to reduce or prevent equipment problems caused by foaming of the slurry. Those of ordinary skill in the art can identify and select a suitable type and amount of defoamer to use in the processes described herein through routine experimentation.

Suitable dispersants include but are not limited to colloids, polyelectrolytes, tetra sodium pyrophosphate, tetra potassium pyrophosphate, polyphosphate, ammonium citrate, ferric ammonium citrate, and sodium hexametaphosphate. In a spray drying process, dispersant can be added to adjust the viscosity of the slurry so as to achieve a target viscosity for the spray drying equipment being used. In addition, in a spray drying process, dispersant can affect the ability to form "solid" substantially round and spherical pellets, and therefore the amount of dispersant, if any, to include in the slurry is minimized, as will be discussed further herein. In certain embodiments where the slurry comprises a dispersant, the amount of dispersant is less than about 0.3 weight percent, less than about 0.5 weight percent, or less than about 1.0 weight percent of the kaolin clay and at least one of the calcined diatomaceous earth, and the burned kaolin clay.

Suitable binders include but are not limited to polyvinyl alcohol, polyvinyl acetate, methylcellulose, dextrin and molasses. Binder may be added to the slurry in the blunger, or preferably, the slurry may be fed from the blunger to a separate tank prior to the addition of the binder. If binder is added to the slurry in the blunger, then it is preferable to reduce the mixing speed of the blunger prior to addition of the binder so as to reduce or prevent excessive foaming and/or viscosity increases that may occur. In a spray drying process, the addition of a binder to the slurry can affect the ability to form "solid" substantially round and spherical pellets, and therefore the amount of binder/dispersant, if any, to include in the slurry is minimized, as will be discussed further herein. In certain embodiments where the slurry comprises a binder, the amount of binder is less than about 0.5 weight percent or less than about 1.0 weight percent of the kaolin clay and at least one of the calcined diatomaceous earth and the burned kaolin clay.

Whether binder, if any, is added to the slurry in the blunger or, as preferred, in a separate tank, the slurry is continually stirred, after addition of the binder, for an amount of time sufficient to allow for the binder to become thoroughly mixed throughout the slurry. In certain embodiments, the amount of time the slurry is stirred is up to about 30 minutes or more after the binder has been added.

From the blunger, or if a binder is used, preferably a separate tank, the slurry is fed to a spray drying apparatus comprising atomizing equipment and a drying chamber. Suitable atomizing equipment includes but is not limited to a rotary wheel atomizer, a pressure nozzle atomizer and a dual fluid nozzle atomizer, all of which are known to those of ordinary skill in the art. Generally, rotary wheel atomizers produce fine particles, while pressure nozzles and dual fluid nozzles operated under pressure can produce comparatively larger particles.

The atomizing equipment sprays the slurry into the drying chamber, where droplets of slurry meet hot air in a drying chamber. The droplets and hot air move through the drying chamber as a generally co-current flow, counter-current flow, or a combination thereof. For example, in a combination of co-current and counter-current flow, slurry droplets are sprayed from the atomizing equipment in an upward direction into the drying chamber, while hot air is fed into the drying chamber from a point above the point at which the slurry is sprayed into the drying chamber. Thus, the hot air flows in a generally downward direction in the chamber with respect to the slurry droplets. The upward flow of the slurry droplets and the downward flow of the hot air establish a counter-current flow. At some point, however, the droplets will exhaust their upward trajectory, and begin to flow in a generally downward direction in the chamber, thereby establishing a co-current flow with the hot air. Alternatively, slurry droplets are sprayed into the drying chamber in a generally downward direction, and the hot air is fed into the drying chamber in a generally downward direction as well, thereby establishing a co-current flow. The cylindrical height of the drying chamber influences the pellet size. For example, the height of drying chamber is estimated to be 19.8 meters for making 30/50 proppant sized pellets (approximately an average green pellet size of 765 microns). In the drying chamber, solid substantially round and spherical green pellets form as moisture is evaporated from the droplets. As used herein, a "solid" substantially round and spherical pellet describes a pellet having an interior void that is less than about 10% by volume of the particle. In certain embodiments, solid substantially round and spherical pellets could have an interior void that is less than about 5% by volume of the pellet. Because the droplets generally do not rotate as they are projected through the drying chamber, one side of the droplet can be exposed to air from the inlet that is hotter than the air to which the other side of the droplet is exposed (referred to herein as the "hot side" and the "cool side", respectively). In such instances, evaporation is faster on the hot side, and the film that forms on the surface of the droplet thickens more rapidly on the hot side than on the cool side. Liquid and solids in the droplet migrate to the hot side. At this point, it would be expected that the cool side would be drawn inward, which would result in a hollow green particle with a dimple, rather than the solid substantially round and spherical green pellets described herein. However, according to the methods described herein, the pellets are solid rather than hollow because of one or more of the following factors: solids content in the weight percents described herein, solubles content (dispersant and/or binder) in the weight percents described herein, and air inlet temperatures in the ranges as described herein.

Regarding the solids content, slurries having solids contents greater than about 50 weight percent are used to produce solid substantially round and spherical particles as described herein. In certain embodiments, the slurry has a solids content in the range of from about 50 to about 75 weight percent, while in other embodiments, the slurry has a solids content in the range from about 50 to about 60 weight percent, or from about 60 to about 70 weight percent.

Regarding the solubles content, binders increase slurry viscosity, which can lead to the need to reduce the solids content in order to maintain a slurry that can be atomized. A lower solids content, however, can lead to a particle that is not solid. As for dispersants, dispersants allow more rapid movement of solids to the surface of the particle, which can also lead to a particle that is not solid. Thus, the solubles content in a slurry (amounts of additives such as binders and dispersants) is balanced against the solids content of the slurry. Preferably, the least amount of binder and/or dispersant, as determined by the need to adjust viscosity of the slurry, is used.

Regarding the air inlet temperatures, the temperature of the air entering a drying chamber is controlled according to methods described herein. Thus, in certain embodiments, the air inlet temperature is in a range from about 100° C. to about 400° C., or from about 100° C. to about 200° C., or from about 200° C. to about 300° C., or from about 300° C. to about 400° C., or from about 400° C. to about 500° C. In other embodiments, the air inlet temperature is in a range of from about 150° C. to about 200° C. or from about 200° C. to about 250° C. Preferably, temperatures in the lower end of such ranges are used in order to slow the rate of drying of the particles, which in turn contributes to the production of green ceramic particles that can be sintered to produce solid ceramic particles that are substantially round and spherical.

Thus, in a spray drying process, solid substantially round and spherical green pellets are discharged from the drying chamber at least in part under the influence of gravity. The solid substantially round and spherical green pellets can then be subjected to sintering operation 106.

Referring again to FIG. 1, substantially round and spherical green pellets produced by either a "wet" or "dry" process are sintered to their final form of low bulk density proppants (operation 106). Sintering can be performed in a rotary kiln, a box kiln, or other suitable device that can provide appropriate sintering conditions. Sintering and equipment to perform sintering are known to those of ordinary skill in the art. Sintering is performed at temperatures and times sufficient to sinter the pellets to a low bulk density. In certain embodiments, sintering is performed at a temperature in the range of from about 1200° C. to about 1350° C. for a time in the range of from about 20 to about 45 minutes at peak temperature.

The low bulk density proppant described herein can be coated, which will result in a coated proppant with an apparent specific gravity (ASG) lower than the ASG of a low bulk density proppant made of the same material without a coating (e.g. an uncoated proppant). According to certain embodiments, substantially all of the surface porosity of the proppant is coated to form a coated proppant, wherein the coated proppant has an apparent specific gravity lower than the apparent specific gravity of the proppant without a coating. The term "apparent specific gravity", ("ASG") as used herein is a number without units, and is numerically equal to the weight in grams per cubic centimeter of volume, excluding any and all open porosity that is connected to the surface of the proppant and used in determining the volume of the proppant pellet, divided by the density of water (approximately 1 g/cc). Suitable coatings for the proppant include but are not limited to polymeric resins and acrylics. A variety of conventional methods and equipment for coating a proppant are known to those of ordinary skill in the art, for example and not limitation, by dipping, spray coating, chemical vapor deposition, physical vapor deposition, or immersion coating.

The following examples are illustrative of the methods discussed above.

Raw Materials Used for Examples 1-4

The chemical analysis and loss on ignition of raw materials used to prepare low bulk density proppant as described in Examples 1-4 are reported in weight percents in Table 1. The calcined kaolin clay, and the burned kaolin clay reported in Table 1 are commercially available from CE Minerals, Andersonville, Ga. The calcined kaolin clay was heated at times and temperatures sufficient to substantially remove organic material and water of hydration. The times and temperatures needed to calcine or burn kaolin clay can be determined by one of ordinary skill in the art without undue experimentation. For example, one may choose a slow heating rate, with a long hold at peak temperature, or a steep heating rate or a high peak temperature, with a shorter hold at such temperature. The calcined kaolin clay and burned kaolin clay were obtained commercially from CE Minerals already calcined and burned. A heat treatment suitable to form calcined kaolin clay or burned kaolin clay as defined herein can be determined by a person of ordinary skill in the art without undue experimentation.

The calcined diatomaceous earth reported in Table 1 is commercially available from EaglePicher Filtration & Minerals, Reno, Nev. under the tradename FW-60. FW-60 grade calcined diatomaceous earth from EaglePicher is described by the manufacturer as flux-calcined diatomaceous earth, however calcined diatomaceous earth suitable for use in the present embodiments can be calcined with or without flux. For example, other grades of calcined diatomaceous earth suitable for use in the present embodiments can be commercially obtained from EaglePicher Filtration & Minerals under the tradenames FW-14 (a flux-calcined diatomaceous earth) and FP-2 (a calcined diatomaceous earth).

The calcined diatomaceous earth was obtained commercially from EaglePicher already calcined. A heat treatment suitable to form calcined diatomaceous earth as defined herein can be determined by a person of ordinary skill in the art without undue experimentation.

TABLE 1

| | Chemical Analysis of Raw Materials (wt. %) | | | | | | | | | |
|---|---|---|---|---|---|---|---|---|---|---|
| | MgO | $Al_2O_3$ | $SiO_2$ | CaO | $Na_2O$ | $K_2O$ | $TiO_2$ | $Fe_2O_3$ | Other | LOI |
| Calcined Kaolin Clay | 0.07 | 45.60 | 51.21 | 0.05 | 0.07 | 0.17 | 1.86 | 0.96 | 0.01 | 2 |
| Calcined Diatomaceous Earth (DE) | 0.28 | 4.37 | 87.51 | 0.59 | 4.78 | 0.24 | 0.26 | 1.91 | 0.07 | 0.25 |
| Burned Kaolin Clay | 0.07 | 45.60 | 51.21 | 0.05 | 0.07 | 0.17 | 1.86 | 0.96 | 0.01 | ~0 |

The weight percentages reported in Table 1 for each the oxides of the calcined kaolin clay, the burned kaolin clay, and the calcined diatomaceous earth were determined by inductively coupled plasma (ICP), which is an analytical method known to those of ordinary skill in the art. "Other" denotes various oxides such as $ZrO_2$, SrO, MnO, ZnO, BaO, or $P_2O_5$. After heat treatment, carbonates are burned off from clay or diatomaceous earth. When this change occurs there is a change in the weight of the material that is referred to as loss on ignition ("LOI"), which is a percentage of the dry weight of the material. Calcined kaolin clays, burned kaolin clays, and calcined diatomaceous earth having other than the chemical analysis reported in Table 1 are also suitable for preparing low bulk density proppant as described herein, as long as such calcined kaolin clays, burned kaolin clays, and calcined diatomaceous earth are within the definitions of such terms as provided herein.

EXAMPLE 1

Pellets Made from Dry Blended Calcined Kaolin & DE Powder

Four batches of pellets were prepared in a "dry" process using a kaolin clay, which in this Example 1 was the calcined kaolin clay reported in Table 1, and the calcined diatomaceous earth (DE) (also reported in Table 1).

The kaolin clay and the calcined diatomaceous earth can be commercially obtained in bulk or in powder form. If in bulk form, the materials are preferably ground to a powder form, for example, to a form having a mean particle size of from about 2 to about 5 microns, and then dry-blended in a high intensity mixer. In the present example, the kaolin clay and the calcined diatomaceous earth were individually ground to powder form, then added to an Eirich mixer in a ratio of 85:15 of kaolin clay to DE. The Eirich mixer has a circular table that can be horizontal or inclined between 0 and 35 degrees from horizontal, and can rotate at a speed of from about 10 to about 60 revolutions per minute (rpm). The mixer also has a rotatable impacting impeller that can rotate at a tip speed of from about 5 to about 50 meters per second. The direction of rotation of the table is opposite that of the impeller, which causes material added to the mixer to flow over itself in countercurrent manner. The central axis of the impacting impeller is generally located within the mixer at a position off center from the central axis of the rotatable table.

For this Example 1, the table of the Eirich mixer was rotated at from about 20 to about 40 rpm, at an incline of about 30 degrees from horizontal. The impacting impeller was initially rotated at about 25-35 meters per second (about 1014-1420 rpm) while the kaolin clay and the calcined diatomaceous earth were mixed. After the kaolin clay and the calcined diatomaceous earth visually appeared to be thoroughly mixed, the speed of the impacting impeller was increased, and water was added to the mixer as described below.

Water was added to the mixer in an amount sufficient to cause formation of substantially round and spherical pellets. In this particular example, the water was fresh tap water, which was added to the mixer in an amount sufficient to provide a percentage, based on the weight of the kaolin clay and the calcined diatomaceous earth in the mixer, from about 18 to about 22 weight percent, although this amount can vary. In general, the quantity of water used in the present methods is that amount which is sufficient to cause substantially round and spherical pellets to form upon mixing.

The rate of water addition to the mixer is not critical. The intense mixing action disperses the water throughout the mixture. During the addition of the first half of the amount of water, the impacting impeller was rotated at about 16 meters per second (about 568 rpm), and was thereafter rotated at a higher tip speed of about 32 meters per second (about 1136 rpm). The initial rotation of the impeller is optional. If employed, the initial rotation is from about 5 to about 20 meters per second, followed by a higher tip speed in a range of from about 25 to about 35 meters per second. Those of ordinary skill in the art can determine whether to adjust the rotation speed of the impeller and/or pan to values greater than or less than those described in this Example 1 such that substantially round and spherical pellets are formed.

The kaolin clay and the calcined diatomaceous were mixed with the water for about 11 minutes, to achieve the formation of substantially round and spherical green pellets of a target green pellet size. The amount of mixing time needed to form such pellets varies depending upon a number of factors, including but not limited to the amount of material in the mixer, the speed of operation of the mixer, the amount of water added to the mixer, and the target green pellet size. The target sintered pellet size in this Example 1 was 20/40 mesh, following the API standard of 90% of the material falling between the 20 mesh screen and the 40 mesh screen. To compensate for shrinkage that occurs during sintering, the target green pellet size for Example 1 was about 1 to 2 U.S. Mesh sizes larger than 20/40 mesh.

The substantially round and spherical green pellets were discharged from the mixer and dried. In the present example, the green pellets were poured in a stainless steel pan and placed overnight in a drying oven operating at 110° C., resulting in dried green pellets having a moisture content of less than about 1 weight percent. The pellets are referred to as "green" after removal from the dryer because they have not been sintered to their final state.

The green pellets formed were placed in alumina boats, which were loaded into a box kiln operating under the conditions described in Table 2A. "HR" indicates the approximate heating rate of the kiln, in ° C. per hour. "Soak Temp" indicates the approximate peak firing temperature of the kiln, and the "Soak Time" indicates the residence time of the pellets in the kiln at the Soak Temp.

TABLE 2A

Sintering Conditions for Dry Blended Calcined Kaolin & DE

|  | 1 | 2 | 3 | 4 |
|---|---|---|---|---|
| HR (° C./hr) | 960 | 960 | 960 | 960 |
| Soak Temp (° C.) | 1490 | 1460 | 1430 | 1400 |
| Soak time (min) | 30 | 30 | 30 | 30 |

Various properties of the sintered pellets prepared from each blend were evaluated. The results are reported in Table 2B. A result reported as "n/a" indicates that the property was not determined.

TABLE 2B

Properties of Sintered Pellets from Dry Blended Calcined Kaolin & DE

|  | 1 | 2 | 3 | 4 |
|---|---|---|---|---|
| BD (g/cc) | 1.24 | 1.24 | 1.23 | 1.17 |
| ASG (unitless) | 2.38 | 2.37 | 2.46 | 2.44 |
| Whole Pellet SG (g/cc) | 2.39 | 2.43 | 2.57 | 2.65 |
| 4 Kpsi Crush (%) | 8.8 | 5.2 | 6.3 | 7.3 |

The ASG values reported in Table 2B were determined by the Archimedes method of liquid (water) displacement according to API Recommended Practices RP60 for testing proppants, which is a text known and available to those of ordinary skill in the art.

The whole pellet specific gravity (SG) reported in Table 2B indicates the density of the pellets, including closed porosity, and was determined with a Micromeritics brand helium gas pycnometer, operated according to the procedures of the manufacturer.

The bulk density (BD) reported in Table 2B includes the void spaces between the pellets as a part of the volume, and was determined by ANSI Test Method B74.4-1992 (R 2002), which is a text known and available to those of ordinary skill in the art.

The crush of the sintered pellets is expressed as a weight percent of fines (i.e., for a 20/40 material it would be material that crushes to be finer than 40 mesh) at a stress of 4,000 psi. The crush values reported in Table 2B were determined according to API Recommended Practices RP60 for testing proppants, which is a text known to those of ordinary skill in the art.

Figure 2:
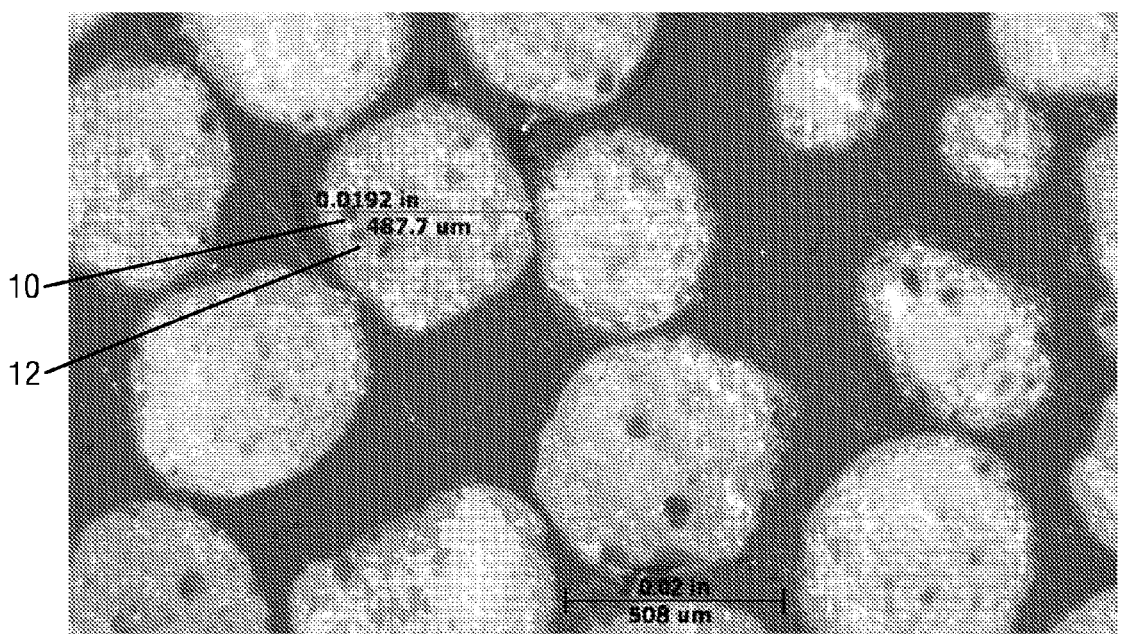
FIG. 2 is an optical micrograph of a cross section of proppant made with calcined kaolin and calcined diatomaceous earth according to one embodiment described herein.
Figure 3:
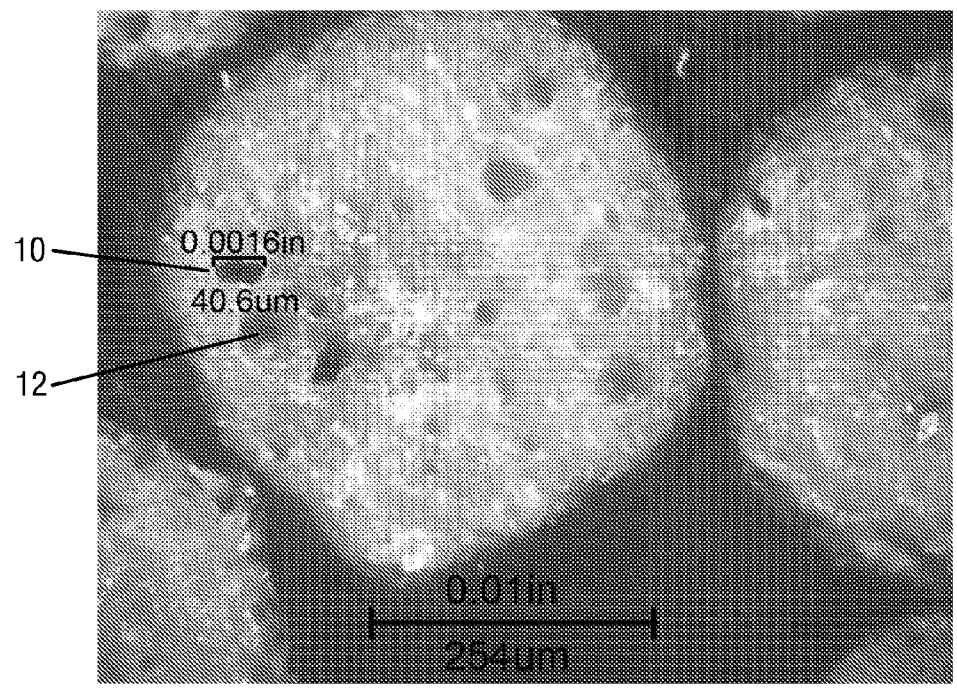
FIG. 3 is a higher magnification optical micrograph of the micrograph illustrated in FIG. 2.

While Table 2B shows that low bulk densities were achieved in each of the four batches, the 4 k crush values were higher than desired. Referring now to FIGS. 2 and 3, optical micrographs were taken of a sample of pellets from Batch No.

4 using a Zeiss Combizoom 400 Microscope System, which is a combination Stereomicroscope (10×-106×) and Compound Microscope (40×-660×).

To obtain the micrographs of FIGS. 2 and 3, the sample of pellets were mounted in epoxy, ground so that half of the pellet thickness was ground away, and then polished to a 1 micron finish. The sample pellets were mounted in epoxy by placing the pellets in the bottom of a 1.25" plastic mounting cup. The cup was then filled with about ½" of epoxy and left to cure. Upon curing, the pellets mounted in an epoxy cylinder were removed from the plastic mounting cup and placed into a sample holder on an automatic polisher (Buehler Beta Grinder/Polisher with a Vector Power Head). The pellets were then ground to approximately half way through the pellets using 60 grit Silicon Carbide. The ground pellets were then polished to a 1 micron finish using diamond polishing compound. Polishing ceramics is a process known to those of ordinary skill in the art. The micrograph illustrated in FIG. 2 was taken at 64× magnification, and the micrograph illustrated in FIG. 3 was taken at 200× magnification.

The micrographs revealed the presence of "macro-pores" in the pellets. For ease of reference, exemplary macro-pores are labeled as 10 and 12 in FIGS. 2 and 3. As illustrated in FIGS. 2 and 3, macropore 10 has a diameter of about 40 microns, although other macro-pores in the pellets could be larger or smaller than macropore 10. As used herein, the term "macro-pore" describes internal voids in the sintered pellets that have a diameter greater than about 5 microns.

It is known that ceramics fail at least in part based on their largest sized flaw. Thus, the larger the flaw, the lower the stress required to make the proppant pellet break. It was theorized that the macro-pores were flaws contributing to the higher than desired crush values, and thus how to reduce or eliminate the size and/or presence of the macro-pores was considered. A result of such consideration was the theory that improving the degree of mixing between the kaolin clay and the calcined diatomaceous earth prior to subjecting them to the "dry" process for formation of green pellets would reduce or eliminate the size and/or presence of the macro-pores.

EXAMPLE 2

Pellets Made from Co-Milled Calcined Kaolin & DE Powders

To test the theory that improved mixing of the kaolin clay and the calcined diatomaceous earth would improve the crush strength of the resulting pellets, three batches of pellets were prepared from the kaolin clay (which was the calcined kaolin clay reported in Table 1) and the calcined diatomaceous earth (DE) (also reported in Table 1), where the kaolin clay and the calcined diatomaceous earth, in powder form, were first dry-blended in an Eirich mixer in a ratio of 85:15 of kaolin clay to DE until they visually appeared to be thoroughly mixed, as described in Example 1. Once the kaolin clay and the calcined diatomaceous earth visually appeared to be mixed, the dry-blend was removed from the Eirich mixer and co-milled by jet-milling in a Sturtevant Inc. 4" Open Manifold Micronizer using a feed rate of about one pound per hour. Other suitable equipment and methods for co-milling raw materials such as the calcined kaolin clay and DE described herein are known to those of ordinary skill in the art.

Substantially round and spherical green pellets were formed from the co-milled kaolin clay and the calcined diatomaceous earth according to a "dry" process using an Eirich mixer and the addition of water as described in Example 1 above. Also as in Example 1, the target sintered pellet size was 20/40 mesh. Thus, the targeted green pellet size was about 1 to 2 mesh sizes larger.

The substantially round and spherical green pellets formed were placed in alumina boats, which were loaded into a box kiln operating under the conditions described in Table 3A.

TABLE 3A

Sintering Conditions for Co-Milled Calcined Kaolin & DE

|  | 1 | 2 | 3 |
|---|---|---|---|
| HR (° C./hr) | 960 | 960 | 960 |
| Soak Temp (° C.) | 1280 | 1300 | 1320 |
| Soak time (min) | 30 | 30 | 30 |

Various properties of the sintered pellets prepared from each of the three batches were evaluated. The results are reported in Table 3B. A result reported as "n/a" indicates that the property was not determined. The 4 Kpsi & 6 Kpsi Short Term Permeabilities of the sintered pellets were determined according to API Recommended Practices RP61 for testing proppants, which is a text known to those of ordinary skill in the art.

TABLE 3B

Properties of Sintered Pellets of Co-Milled Calcined Kaolin & DE

|  | 1 | 2 | 3 |
|---|---|---|---|
| BD (g/cc) | 1.10 | 1.15 | 1.14 |
| ASG (unitless) | 2.50 | 2.56 | 2.57 |
| Whole Pellet SG (g/cc) | 2.76 | 2.75 | 2.77 |
| 4 Kpsi Crush (%) | 4.8 | 3.5 | 3.6 |
| 4 Kpsi ST Perm (Darcies) | n/a | 259 | n/a |
| 6 Kpsi ST Perm (Darcies) | n/a | 155 | n/a |

Table 3B shows that low bulk densities were achieved for each of the three batches. Table 3B also shows that the sintered pellets prepared from co-milled materials have a higher strength, as evidenced by the lower crush values, as compared to the sintered pellets of Example 1.

Figure 4:
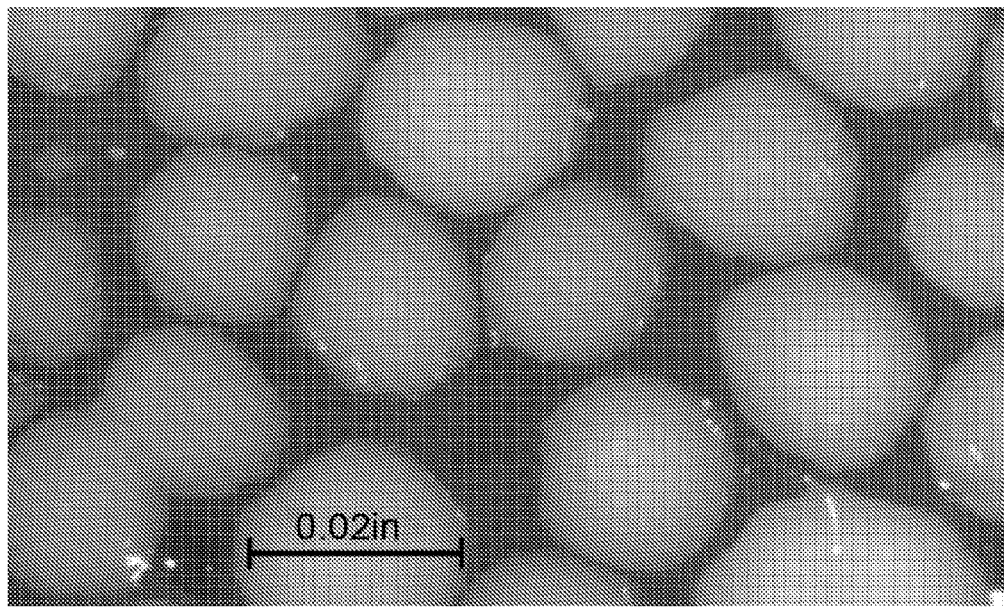
FIG. 4 is an optical micrograph of a cross section of proppant made with calcined kaolin and calcined diatomaceous earth according to another embodiment described herein.
Figure 5:
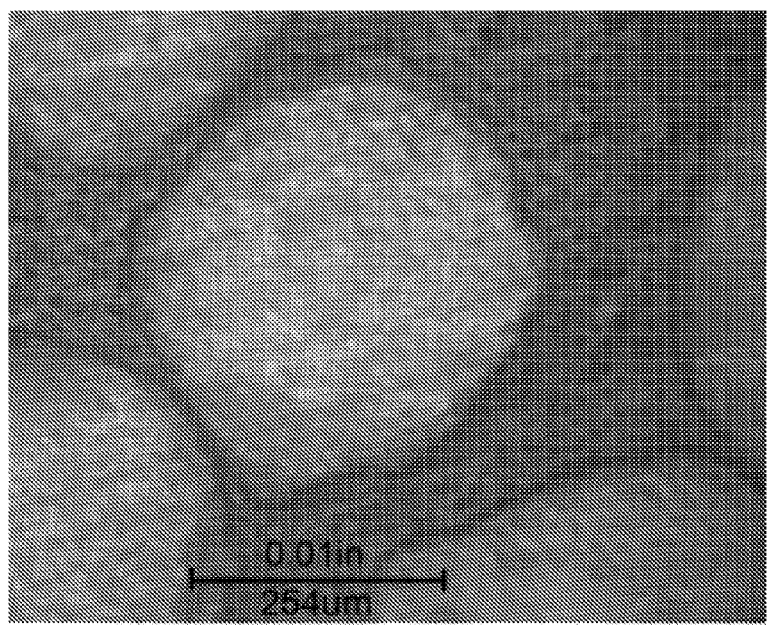
FIG. 5 is a higher magnification optical micrograph of the micrograph illustrated in FIG. 4.

Referring now to FIGS. 4 and 5, optical micrographs taken of pellets from Batch No. 2 of this Example 2 were obtained according to the procedures described for FIGS. 2 and 3 that reveal that the macro-pores observed in Example 1 have been eliminated, thus proving the theory that co-milling the kaolin clay and the calcined diatomaceous earth would reduce or eliminate the size and/or presence of macro-pores, and thereby improve the crush strength of the final products. The micrograph illustrated in FIG. 4 was taken at 64× magnification, and the micrograph illustrated in FIG. 5 was taken at 200× magnification.

EXAMPLE 3

Control Pellets Made from Co-Milled Calcined Kaolin

Proppant having a higher crush strength generally provides improved permeability when used in hydraulic fracturing operations as compared to proppant having a lower crush strength. Thus, it was theorized that proppant prepared from kaolin clay and at least one of calcined diatomaceous earth and burned kaolin clay as described herein would demonstrate improved permeability over known proppant products, of similar size and bulk density, made with kaolin clay, but without an additive of at least one of calcined diatomaceous earth and burned kaolin clay.

A control proppant was prepared from the calcined kaolin clay reported in Table 1. The calcined kaolin clay was first dry-blended in an Eirich mixer, and then jet-milled as described in Example 2, but neither calcined diatomaceous earth nor burned kaolin clay was added. Substantially round and spherical green pellets were formed from the jet-milled kaolin clay powder according to a process using a high intensity mixer as described in Example 1 above.

The substantially round and spherical green pellets formed were placed in alumina boats, which were loaded into a box kiln operating under the conditions described in Table 4A.

TABLE 4A

Sintering Conditions for Co-Milled Calcined Kaolin

|  | 1 | 2 | 3 |
|---|---|---|---|
| HR (° C./hr) | 960 | 960 | 960 |
| Soak Temp (° C.) | 1250 | 1265 | 1300 |
| Soak time (min) | 30 | 30 | 30 |

Various properties of the sintered pellets prepared from each blend were evaluated. The results are reported in Table 4B. A result reported as "n/a" indicates that the property was not determined.

TABLE 4B

Properties of Sintered Pellets of Co-Milled Calcined Kaolin

|  | 1 | 2 | 3 |
|---|---|---|---|
| BD (g/cc) | 1.08 | 1.14 | 1.27 |
| ASG (unitless) | 2.49 | 2.58 | 2.67 |
| Whole Pellet SG (g/cc) | 2.87 | 2.85 | 2.86 |
| 4 Kpsi Crush (%) | 8.6 | 4.3 | 2.9 |
| 4 Kpsi ST Perm (Darcies) | n/a | 219 | n/a |
| 6 Kpsi ST Perm (Darcies) | n/a | 109 | n/a |

Table 4B shows that low bulk densities were achieved for each of the three batches of control proppant. In addition, batches 2 and 3 achieved 4 Kpsi crush strengths comparable to the batches of Example 2. However, the batches of Example 2 that were tested for permeability (Example 2, Batch No. 2) had unexpectedly higher 4 Kpsi and 6 Kpsi ST permeabilities than the permeability measured in the control proppant (Example 3, Batch No. 2) at the same pressures. A comparison of the Short Term Permeabilities in Tables 3B and 4B shows that the proppant of Batch No. 2 of Example 2 has an 18% higher permeability at 4 Kpsi and a 42% higher permeability at 6 Kpsi than Batch No. 2 of the control proppant of Example 3.

Figure 6:
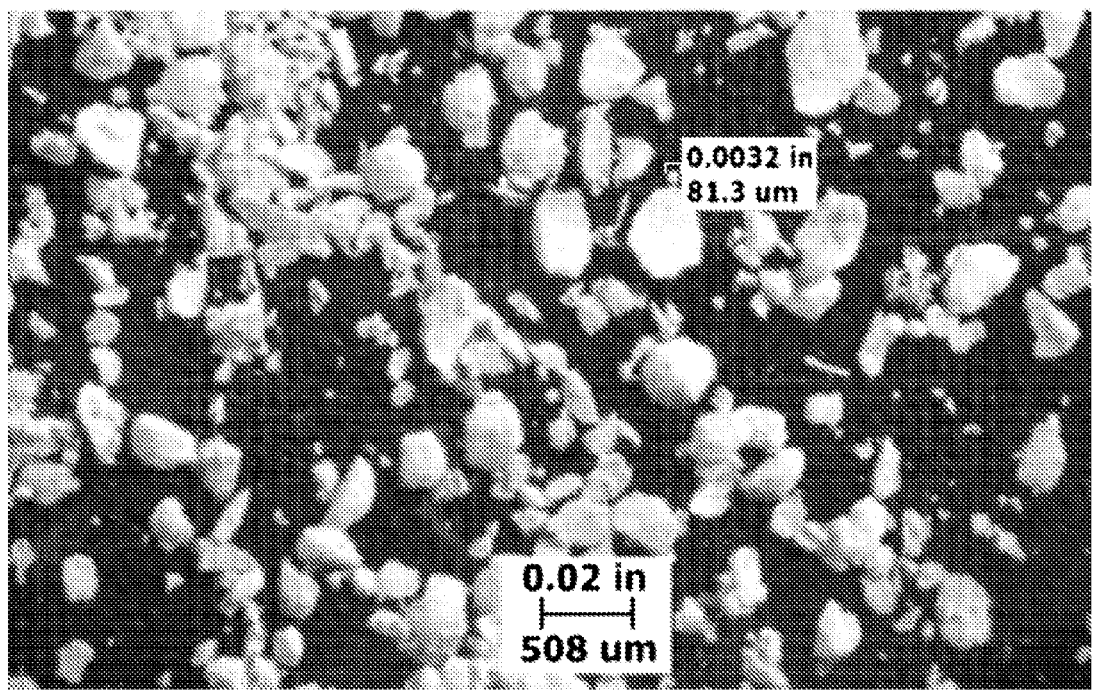
FIG. 6 is an optical micrograph of the crushed portion of a proppant made from calcined kaolin according to a known method.

FIG. 6 is an optical micrograph of crushed proppant from Batch No. 2 (soak temp 1265° C.) of the control proppant made in Example 3. The micrograph shown in FIG. 6 was taken by first performing a crush test on the sample at 4,000 psi, and then retaining the material which was screened to minus 40 mesh. The micrograph of the retained material (i.e., the minus 40 mesh material) was then obtained according to the procedure described for FIGS. 2 and 3. The micrograph illustrated in FIG. 6 was taken at 25.6× magnification.

Figure 7:
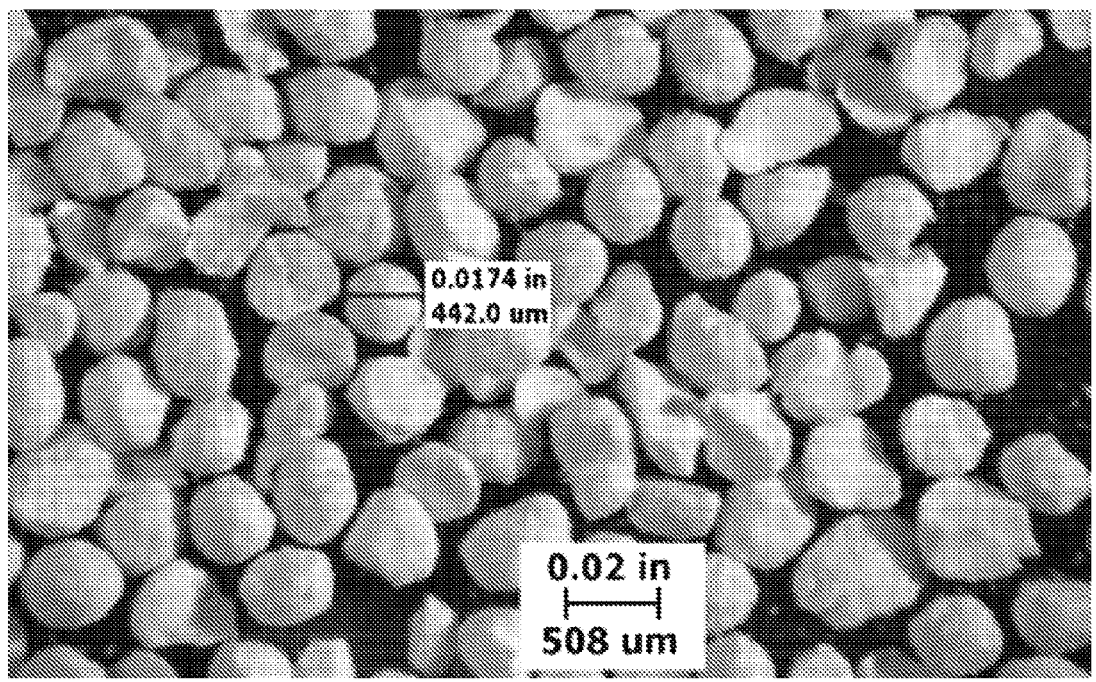
FIG. 7 is an optical micrograph of the crushed portion of a proppant made from calcined kaolin and calcined diatomaceous earth according to one embodiment disclosed herein.

FIG. 7 is an optical micrograph of crushed proppant from Batch No. 2 (soak temp 1300° C.) of the proppant made from co-milled kaolin clay and calcined diatomaceous earth in Example 2. The micrograph shown in FIG. 7 was taken by first performing a crush test on the sample at 4,000 psi, and then retaining the material which was screened to minus 40 mesh. The micrograph of the retained material (i.e., the minus 40 mesh material) was then obtained according to the procedure described for FIGS. 2 and 3. The micrograph illustrated in FIG. 7 was taken at 25.6× magnification.

As evident in FIGS. 6 and 7, the control proppant fractured into a large number of small pieces upon fracturing, while the proppant made with kaolin clay and calcined DE fractured into larger pieces. Larger pieces are less likely to migrate in a propped well, and so would result in improved permeability and therefore increased oil or gas production.

It was theorized that the phenomenon of the proppant made with kaolin clay and calcined diatomaceous earth fracturing into larger pieces than the proppant made with just kaolin clay was caused by increased kaolin matrix strength due to the higher sintering temperature (soak temperature) required to achieve the same bulk density in proppant made with 15% calcined DE (Example 2) compared to proppant made from 100% kaolin clay (Example 3). Basically, to achieve equal bulk densities, a higher soak temperature is required when calcined DE is present than when it is not.

EXAMPLE 4

Pellets Made from Co-Milled Calcined & Burned Kaolin Powders

For this Example 4, three batches of proppant were prepared from a co-milled kaolin clay (the calcined kaolin clay reported in Table 1) and burned kaolin clay (the burned kaolin clay reported in Table 1).

The kaolin clay and the burned kaolin clay were individually ground to powder form, and then dry-blended in an Eirich mixer in a ratio of 85:15 of kaolin clay to burned kaolin clay until the powders visually appeared to be thoroughly mixed, as described in Example 1. The dry-blended kaolin clay and the burned kaolin clay were co-milled in a jet mill as described in Example 2. Substantially round and spherical green pellets were formed from the jet-milled kaolin clay and the burned kaolin clay according to a process using a high intensity mixer as described in Example 1 above.

The substantially round and spherical green pellets formed were placed in alumina boats, which were loaded into a box kiln operating under the conditions described in Table 5A.

TABLE 5A

Sintering Conditions for Co-Milled Calcined & Burned Kaolin

|  | 1 | 2 | 3 |
|---|---|---|---|
| HR (° C./hr) | 960 | 960 | 960 |
| Soak Temp (° C.) | 1280 | 1290 | 1295 |
| Soak time (min) | 30 | 30 | 30 |

Various properties of the sintered pellets prepared from each blend were evaluated. The results are reported in Table 5B. A result reported as "n/a" indicates that the property was not determined.

TABLE 5B

Properties of Sintered Pellets of Co-Milled Calcined & Burned Kaolin

|  | 1 | 2 | 3 |
|---|---|---|---|
| BD (g/cc) | 1.12 | 1.13 | 1.16 |
| ASG (unitless) | 2.59 | 2.59 | 2.64 |
| Whole Pellet SG (g/cc) | 2.84 | 2.84 | 2.85 |
| 4 Kpsi Crush (%) | 6.9 | 4.7 | 3.8 |
| 4 Kpsi ST Perm (Darcies) | n/a | n/a | 242 |
| 6 Kpsi ST Perm (Darcies) | n/a | n/a | 124 |

Table 5B shows that low bulk densities were achieved for each of the three batches. Table 5B also shows that the sintered pellets prepared from co-milled kaolin clay and burned kaolin clay have 4 Kpsi crush strengths generally comparable to the 4 Kpsi crush strengths of sintered pellets prepared from co-milled kaolin clay and calcined diatomaceous earth (Example 2).

Figure 8:
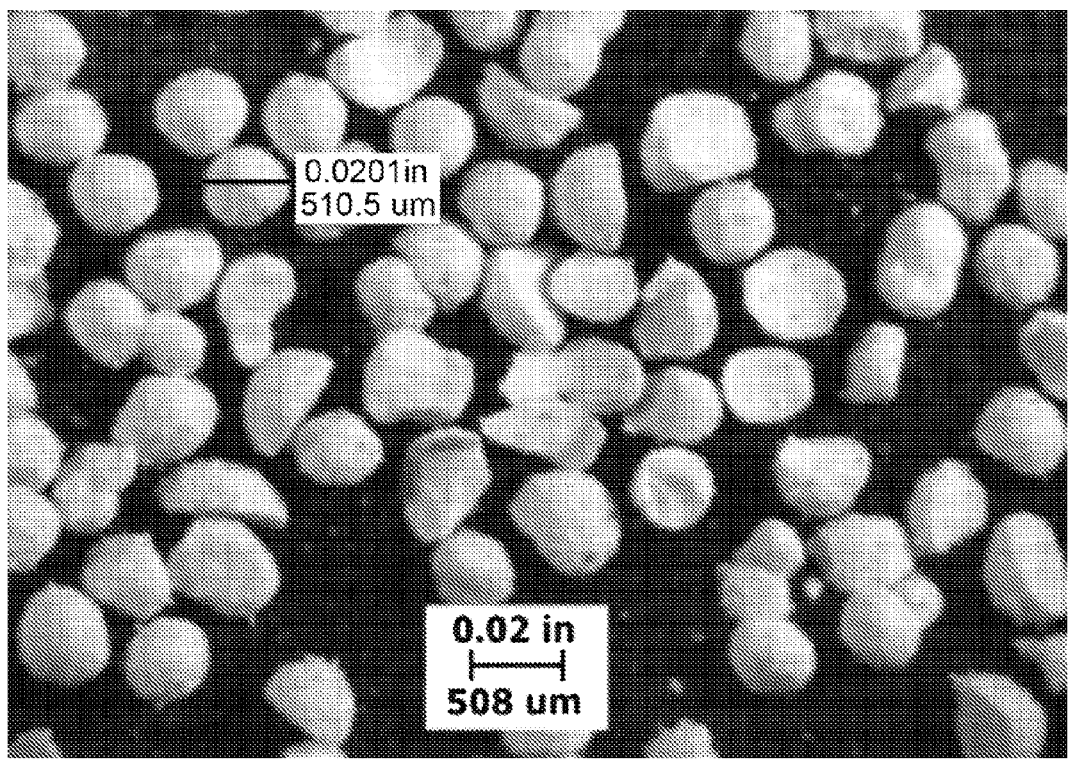
FIG. 8 is an optical micrograph of the crushed portion of a proppant made from calcined kaolin and burned kaolin according to another embodiment disclosed herein.

FIG. 8 is an optical micrograph of crushed proppant from Batch No. 3 (soak temp 1295° C.) of this Example 4. The micrograph shown in FIG. 8 was taken by first performing a crush test on the sample at 4,000 psi, and then retaining the material which was screened to minus 40 mesh. The micrograph of the retained material (i.e., the minus 40 mesh material) was then obtained according to the procedure described for FIGS. 2 and 3. The micrograph illustrated in FIG. 8 was taken at 25.6× magnification.

Comparing FIG. 8 to FIG. 6, it is evident that the proppant made with kaolin clay and burned kaolin clay fractured into larger pieces than did the control proppant. The larger pieces are less likely to migrate in a propped well, and so would result in improved permeability and therefore increased oil or gas production.

Comparison of Short Term Permeabilities of Examples 2-4, and Sand

Figure 9:
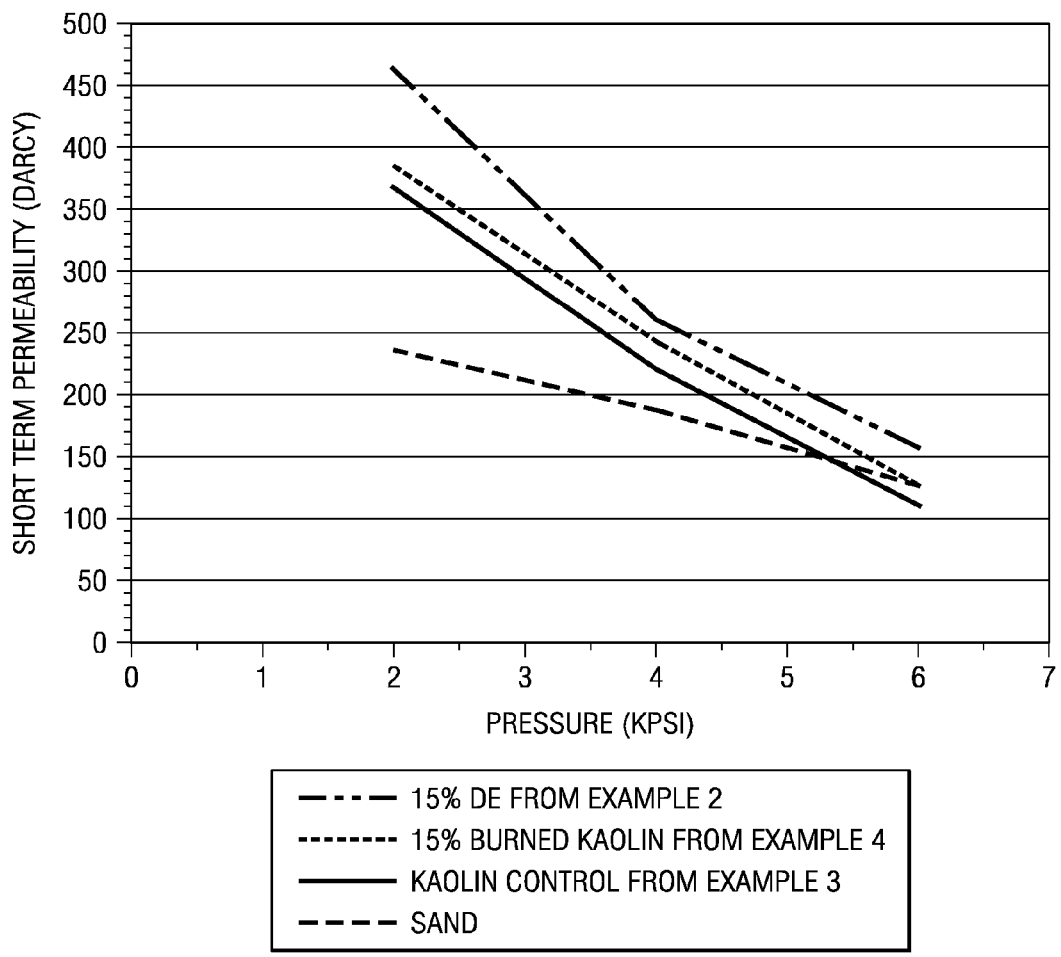
FIG. 9 is a plot of the closing pressure as a function of the permeability for proppant tested in a short term conductivity apparatus showing the increased permeability of proppant made according to embodiments described herein.

FIG. 9 shows the short term permeability as a function of closing pressure for Batch No. 2 of Example 2, Batch No. 2 of Example 3 and Batch No. 3 of Example 4. The short term permeability for a sample of 20/40 mesh fracture sand obtained from Badger Mining and having a bulk density of 1.57 g/cc is also illustrated in FIG. 9. The short term permeability of the fracture sand was obtained as described above with respect to Examples 2, 3 and 4.

FIG. 9 illustrates that proppant prepared from kaolin clay and at least one of calcined diatomaceous earth and burned kaolin clay has better short term permeability than an equivalent low bulk density proppant made with the kaolin clay and without at least one of calcined diatomaceous earth and burned kaolin clay, and better short term permeability than fracture sand of comparable size. It is particularly noted that the proppant made with kaolin clay and at least one of calcined diatomaceous earth and burned kaolin clay achieved better short term permeability than the Badger fracture sand and had a lower bulk density than the Badger fracture sand, thus making proppant according the current embodiments particularly useful. A proppant made with kaolin clay and at least one of calcined diatomaceous earth and burned kaolin clay has a short term permeability that is 25% greater than the Badger fracture sand.

It will be obvious to those skilled in the art that the invention described herein can be essentially duplicated by making minor changes in the material content or the method of manufacture. To the extent that such material or methods are substantially equivalent, it is intended that they be encompassed by the following claims.

The invention claimed is:

1. A method for forming a low bulk density proppant comprising:
co-milling raw materials to form substantially round and spherical green pellets, wherein the raw materials comprise water, non-burned kaolin clay and burned kaolin clay, wherein the non-burned kaolin clay consists essentially of kaolin clay that does not include mullite and wherein the burned kaolin clay comprises cristobalite and at least 5 weight percent mullite; and
sintering the pellets to form a proppant having a bulk density of less than about 1.60 g/cc;
wherein the proppant has a short term permeability greater than that of a proppant having a bulk density of less than about 1.60 g/cc made from pellets consisting of water and non-burned kaolin clay.

2. The method of claim 1 wherein the short term permeability of the proppant is 10% to 50% greater than the short term permeability of a proppant having a bulk density less than about 1.60 g/cc made from pellets consisting of water and non-burned kaolin clay.

3. A method for producing a low bulk density proppant comprising:
heating kaolin clay at a temperature above 800° C. sufficient to produce a burned kaolin clay comprising cristobalite and at least 5 weight percent of mullite;
co-milling a non-burned kaolin clay and the burned kaolin clay to form a co-milled mixture, wherein the non-burned kaolin clay consists essentially of kaolin clay that does not include mullite;
forming substantially round and spherical green pellets from the co-milled mixture and water; and
sintering the pellets to form a proppant having a bulk density of less than about 1.60 g/cc; wherein the proppant has a short term permeability greater than that of proppant having a bulk density of less than about 1.60 g/cc made from pellets consisting of water and non-burned kaolin clay.

4. The method of claim 3 wherein the burned kaolin clay comprises at least 50 weight percent of mullite.

5. The method of claim 3 wherein the burned kaolin clay comprises at least 65 weight percent of mullite and at least 15 weight percent of cristobalite.

6. The method of claim 1 wherein the raw materials further comprise calcined diatomaceous earth.

\* \* \* \* \*